US010999439B2

(12) United States Patent
Chishti et al.

(10) Patent No.: US 10,999,439 B2
(45) Date of Patent: **\*May 4, 2021**

(54) TECHNIQUES FOR ESTIMATING EXPECTED PERFORMANCE IN A TASK ASSIGNMENT SYSTEM

(71) Applicant: Afiniti Europe Technologies Limited, Cheshire (GB)

(72) Inventors: Zia Chishti, Washington, DC (US); Ittai Kan, McLean, VA (US); Vikash Khatri, Alexandria, VA (US)

(73) Assignee: Afiniti, Ltd., Hamilton (BM)

(\*) Notice: Subject to any disclaimer, the term of this patent is extended or adjusted under 35 U.S.C. 154(b) by 0 days.

This patent is subject to a terminal disclaimer.

(21) Appl. No.: 16/930,624

(22) Filed: Jul. 16, 2020

(65) Prior Publication Data

US 2020/0351400 A1    Nov. 5, 2020

Related U.S. Application Data

(63) Continuation of application No. 16/527,588, filed on Jul. 31, 2019, now Pat. No. 10,757,560, which is a
(Continued)

(51) Int. Cl.
*H04M 3/00* (2006.01)
*H04M 3/523* (2006.01)
(Continued)

(52) U.S. Cl.
CPC .... *H04M 3/5232* (2013.01); *G06Q 10/06311* (2013.01); *H04M 3/5175* (2013.01); *H04M 2203/401* (2013.01); *H04M 2203/402* (2013.01)

(58) Field of Classification Search
CPC ............. H04M 3/5175; H04M 3/523; H04M 2203/401; H04M 3/5232
(Continued)

(56) References Cited

U.S. PATENT DOCUMENTS 5,155,763 A    10/1992    Bigus et al.
5,206,903 A    4/1993    Kohler et al.
(Continued)

FOREIGN PATENT DOCUMENTS

AU    2008349500 C1    5/2014
AU    2009209317 B2    5/2014
(Continued)

OTHER PUBLICATIONS

Afiniti, "Afiniti® Enterprise Behavioral Pairing—Improves Contact Center Performance," White Paper, retreived online from URL: <http://www.afinitit,com/wp-content/uploads/2016/04/Afiniti_White-Paper_Web-Email.pdf> 11 pages (2016).
(Continued)

*Primary Examiner* — Rasha S Aubaidi
(74) *Attorney, Agent, or Firm* — Wilmer Cutler Pickering Hale and Dorr LLP

(57) ABSTRACT

Techniques for estimating expected performance of a task assignment strategy in a task assignment system are disclosed. In one particular embodiment, the techniques may be realized as a method comprising receiving, by at least one computer processor communicatively coupled to a task assignment system, a plurality of historical agent task assignments; determining, by the at least one computer processor, a sample of the plurality based on a strategy for pairing agents with tasks; determining, by the at least one computer processor, an expected performance of the strategy based on the sample; outputting, by the at least one computer processor, the expected performance; and optimizing, by the at least one computer processor, the performance of the task assignment system based on the expected performance.

21 Claims, 21 Drawing Sheets

Related U.S. Application Data continuation of application No. 16/173,997, filed on Oct. 29, 2018, now Pat. No. 10,375,246, which is a continuation of application No. 15/648,788, filed on Jul. 13, 2017, now Pat. No. 10,116,795, which is a continuation of application No. 15/645,277, filed on Jul. 10, 2017, now Pat. No. 10,122,860.

(51) Int. Cl.
*H04M 3/51* (2006.01)
*G06Q 10/06* (2012.01)

(58) Field of Classification Search
USPC ............ 379/265.01–265.02, 265.05–265.06, 379/266.01–266.02
See application file for complete search history.

(56) References Cited

U.S. PATENT DOCUMENTS

| | | |
|---|---|---|
| 5,327,490 A | 7/1994 | Cave |
| 5,537,470 A | 7/1996 | Lee |
| 5,702,253 A | 12/1997 | Bryce et al. |
| 5,825,869 A | 10/1998 | Brooks et al. |
| 5,903,641 A | 5/1999 | Tonisson |
| 5,907,601 A | 5/1999 | David et al. |
| 5,926,538 A | 7/1999 | Deryugin et al. |
| 6,049,603 A | 4/2000 | Schwartz et al. |
| 6,052,460 A | 4/2000 | Fisher et al. |
| 6,064,731 A | 5/2000 | Flockhart et al. |
| 6,088,444 A | 7/2000 | Walker et al. |
| 6,163,607 A | 12/2000 | Bogart et al. |
| 6,222,919 B1 | 4/2001 | Hollatz et al. |
| 6,292,555 B1 | 9/2001 | Okamoto |
| 6,324,282 B1 | 11/2001 | McLllwaine et al. |
| 6,333,979 B1 | 12/2001 | Bondi et al. |
| 6,389,132 B1 | 5/2002 | Price |
| 6,389,400 B1 | 5/2002 | Bushey et al. |
| 6,408,066 B1 | 6/2002 | Andruska et al. |
| 6,411,687 B1 | 6/2002 | Bohacek et al. |
| 6,424,709 B1 | 7/2002 | Doyle et al. |
| 6,434,230 B1 | 8/2002 | Gabriel |
| 6,496,580 B1 | 12/2002 | Chack |
| 6,504,920 B1 | 1/2003 | Okon et al. |
| 6,519,335 B1 | 2/2003 | Bushnell |
| 6,526,135 B1 | 2/2003 | Paxson |
| 6,535,600 B1 | 3/2003 | Fisher et al. |
| 6,535,601 B1 | 3/2003 | Flockhart et al. |
| 6,570,980 B1 | 5/2003 | Baruch |
| 6,587,556 B1 | 7/2003 | Judkins et al. |
| 6,603,854 B1 | 8/2003 | Judkins et al. |
| 6,639,976 B1 | 10/2003 | Shellum et al. |
| 6,661,889 B1 | 12/2003 | Flockhart et al. |
| 6,704,410 B1 | 3/2004 | McFarlane et al. |
| 6,707,904 B1 | 3/2004 | Judkins et al. |
| 6,714,643 B1 | 3/2004 | Gargeya et al. |
| 6,744,878 B1 | 6/2004 | Komissarchik et al. |
| 6,763,104 B1 | 7/2004 | Judkins et al. |
| 6,774,932 B1 | 8/2004 | Ewing et al. |
| 6,775,378 B1 | 8/2004 | Villena et al. |
| 6,798,876 B1 | 9/2004 | Bala |
| 6,829,348 B1 | 12/2004 | Schroeder et al. |
| 6,832,203 B1 | 12/2004 | Villena et al. |
| 6,859,529 B2 | 2/2005 | Duncan et al. |
| 6,895,083 B1 | 5/2005 | Bers et al. |
| 6,922,466 B1 | 7/2005 | Peterson et al. |
| 6,937,715 B2 | 8/2005 | Delaney |
| 6,956,941 B1 | 10/2005 | Duncan et al. |
| 6,970,821 B1 | 11/2005 | Shambaugh et al. |
| 6,978,006 B1 | 12/2005 | Polcyn |
| 7,023,979 B1 | 4/2006 | Wu et al. |
| 7,039,166 B1 | 5/2006 | Peterson et al. |
| 7,050,566 B2 | 5/2006 | Becerra et al. |
| 7,050,567 B1 | 5/2006 | Jensen |
| 7,062,031 B2 | 6/2006 | Becerra et al. |
| 7,068,775 B1 | 6/2006 | Lee |
| 7,092,509 B1 | 8/2006 | Mears et al. |
| 7,103,172 B2 | 9/2006 | Brown et al. |
| 7,158,628 B2 | 1/2007 | McConnell et al. |
| 7,184,540 B2 | 2/2007 | Dezonno et al. |
| 7,209,549 B2 | 4/2007 | Reynolds et al. |
| 7,231,032 B2 | 6/2007 | Nevman et al. |
| 7,231,034 B1 | 6/2007 | Rikhy et al. |
| 7,236,584 B2 | 6/2007 | Torba |
| 7,245,716 B2 | 7/2007 | Brown et al. |
| 7,245,719 B2 | 7/2007 | Kawada et al. |
| 7,266,251 B2 | 9/2007 | Rowe |
| 7,269,253 B1 | 9/2007 | Wu et al. |
| 7,353,388 B1 | 4/2008 | Gilman et al. |
| 7,398,224 B2 | 7/2008 | Cooper |
| 7,593,521 B2 | 9/2009 | Becerra et al. |
| 7,676,034 B1 | 3/2010 | Wu et al. |
| 7,725,339 B1 | 5/2010 | Aykin |
| 7,734,032 B1 | 6/2010 | Kiefhaber et al. |
| 7,798,876 B2 | 9/2010 | Mix |
| 7,826,597 B2 | 11/2010 | Berner et al. |
| 7,864,944 B2 | 1/2011 | Khouri et al. |
| 7,899,177 B1 | 3/2011 | Bruening et al. |
| 7,916,858 B1 | 3/2011 | Heller et al. |
| 7,940,917 B2 | 5/2011 | Lauridsen et al. |
| 7,961,866 B1 | 6/2011 | Boutcher et al. |
| 7,995,717 B2 | 8/2011 | Conway et al. |
| 8,000,989 B1 | 8/2011 | Kiefhaber et al. |
| 8,010,607 B2 | 8/2011 | McCormack et al. |
| 8,094,790 B2 | 1/2012 | Conway et al. |
| 8,126,133 B1 | 2/2012 | Everingham et al. |
| 8,140,441 B2 | 3/2012 | Cases et al. |
| 8,175,253 B2 | 5/2012 | Knott et al. |
| 8,229,102 B2 | 7/2012 | Knott et al. |
| 8,249,245 B2 | 8/2012 | Jay et al. |
| 8,295,471 B2 | 10/2012 | Spottiswoode et al. |
| 8,300,798 B1 | 10/2012 | Wu et al. |
| 8,359,219 B2 | 1/2013 | Chishti et al. |
| 8,395,994 B2 | 3/2013 | Stevenson et al. |
| 8,433,597 B2 | 4/2013 | Chishti et al. |
| 8,472,611 B2 | 6/2013 | Chishti |
| 8,565,410 B2 | 10/2013 | Chishti et al. |
| 8,634,542 B2 | 1/2014 | Spottiswoode et al. |
| 8,644,490 B2 | 2/2014 | Stewart |
| 8,670,548 B2 | 3/2014 | Xie et al. |
| 8,699,694 B2 | 4/2014 | Chishti et al. |
| 8,712,821 B2 | 4/2014 | Spottiswoode |
| 8,718,271 B2 | 5/2014 | Spottiswoode |
| 8,724,797 B2 | 5/2014 | Chishti et al. |
| 8,731,178 B2 | 5/2014 | Chishti et al. |
| 8,737,595 B2 | 5/2014 | Chishti et al. |
| 8,750,488 B2 | 6/2014 | Spottiswoode et al. |
| 8,761,380 B2 | 6/2014 | Kohler et al. |
| 8,781,100 B2 | 7/2014 | Spottiswoode et al. |
| 8,781,106 B2 | 7/2014 | Afzal |
| 8,792,630 B2 | 7/2014 | Chishti et al. |
| 8,824,658 B2 | 9/2014 | Chishti |
| 8,831,207 B1 | 9/2014 | Agarwal |
| 8,879,715 B2 | 11/2014 | Spottiswoode et al. |
| 8,903,079 B2 | 12/2014 | Xie et al. |
| 8,913,736 B2 | 12/2014 | Kohler et al. |
| 8,929,537 B2 | 1/2015 | Chishti et al. |
| 8,938,063 B1 | 1/2015 | Hackbarth et al. |
| 8,995,647 B2 | 3/2015 | Li et al. |
| 9,020,137 B2 | 4/2015 | Chishti et al. |
| 9,025,757 B2 | 5/2015 | Spottiswoode et al. |
| 9,215,323 B2 | 12/2015 | Chishti |
| 9,277,055 B2 | 3/2016 | Spottiswoode et al. |
| 9,300,802 B1 | 3/2016 | Chishti |
| 9,313,332 B1 | 4/2016 | Kumar et al. |
| 9,426,296 B2 | 8/2016 | Chishti et al. |
| 9,712,676 B1 | 7/2017 | Chishti |
| 9,712,679 B2 | 7/2017 | Chishti et al. |
| 2001/0032120 A1 | 10/2001 | Stuart et al. |
| 2002/0018554 A1 | 2/2002 | Jensen et al. |
| 2002/0046030 A1 | 4/2002 | Haritsa et al. |
| 2002/0059164 A1 | 5/2002 | Shtivelman |
| 2002/0082736 A1 | 6/2002 | Lech et al. |
| 2002/0110234 A1 | 8/2002 | Walker et al. |

(56) References Cited

U.S. PATENT DOCUMENTS

| | | |
|---|---|---|
| 2002/0111172 A1 | 8/2002 | DeWolf et al. |
| 2002/0131399 A1 | 9/2002 | Philonenko |
| 2002/0138285 A1 | 9/2002 | DeCotiis et al. |
| 2002/0143599 A1 | 10/2002 | Nourbakhsh et al. |
| 2002/0161765 A1 | 10/2002 | Kundrot et al. |
| 2002/0184069 A1 | 12/2002 | Kosiba et al. |
| 2002/0196845 A1 | 12/2002 | Richards et al. |
| 2003/0002653 A1 | 1/2003 | Uckun |
| 2003/0059029 A1 | 3/2003 | Mengshoel et al. |
| 2003/0081757 A1 | 5/2003 | Mengshoel et al. |
| 2003/0095652 A1 | 5/2003 | Mengshoel et al. |
| 2003/0169870 A1 | 9/2003 | Stanford |
| 2003/0174830 A1 | 9/2003 | Boyer et al. |
| 2003/0217016 A1 | 11/2003 | Pericle |
| 2004/0028211 A1 | 2/2004 | Culp et al. |
| 2004/0057416 A1 | 3/2004 | McCormack |
| 2004/0096050 A1 | 5/2004 | Das et al. |
| 2004/0098274 A1 | 5/2004 | Dezonno et al. |
| 2004/0101127 A1 | 5/2004 | Dezonno et al. |
| 2004/0109555 A1 | 6/2004 | Williams |
| 2004/0133434 A1 | 7/2004 | Szlam et al. |
| 2004/0210475 A1 | 10/2004 | Starnes et al. |
| 2004/0230438 A1 | 11/2004 | Pasquale et al. |
| 2004/0267816 A1 | 12/2004 | Russek |
| 2005/0013428 A1 | 1/2005 | Walters |
| 2005/0043986 A1 | 2/2005 | McConnell et al. |
| 2005/0047581 A1 | 3/2005 | Shaffer et al. |
| 2005/0047582 A1 | 3/2005 | Shaffer et al. |
| 2005/0071223 A1 | 3/2005 | Jain et al. |
| 2005/0129212 A1 | 6/2005 | Parker |
| 2005/0135593 A1 | 6/2005 | Becerra et al. |
| 2005/0135596 A1 | 6/2005 | Zhao |
| 2005/0187802 A1 | 8/2005 | Koeppel |
| 2005/0195960 A1 | 9/2005 | Shaffer et al. |
| 2005/0286709 A1 | 12/2005 | Horton et al. |
| 2006/0098803 A1 | 5/2006 | Bushey et al. |
| 2006/0110052 A1 | 5/2006 | Finlayson |
| 2006/0124113 A1 | 6/2006 | Roberts |
| 2006/0184040 A1 | 8/2006 | Keller et al. |
| 2006/0222164 A1 | 10/2006 | Contractor et al. |
| 2006/0233346 A1 | 10/2006 | McIlwaine et al. |
| 2006/0262918 A1 | 11/2006 | Karnalkar et al. |
| 2006/0262922 A1 | 11/2006 | Margulies et al. |
| 2007/0036323 A1 | 2/2007 | Travis |
| 2007/0071222 A1 | 3/2007 | Flockhart et al. |
| 2007/0116240 A1 | 5/2007 | Foley et al. |
| 2007/0121602 A1 | 5/2007 | Sin et al. |
| 2007/0121829 A1 | 5/2007 | Tal et al. |
| 2007/0136342 A1 | 6/2007 | Singhai et al. |
| 2007/0154007 A1 | 7/2007 | Bernhard |
| 2007/0174111 A1 | 7/2007 | Anderson et al. |
| 2007/0198322 A1 | 8/2007 | Bourne et al. |
| 2007/0211881 A1 | 9/2007 | Parker-Stephen |
| 2007/0219816 A1 | 9/2007 | Van Luchene et al. |
| 2007/0274502 A1 | 11/2007 | Brown |
| 2008/0002823 A1 | 1/2008 | Fama et al. |
| 2008/0008309 A1 | 1/2008 | Dezonno et al. |
| 2008/0046386 A1 | 2/2008 | Pieraccinii et al. |
| 2008/0065476 A1 | 3/2008 | Klein et al. |
| 2008/0118052 A1 | 5/2008 | Houmaidi et al. |
| 2008/0144803 A1 | 6/2008 | Jaiswal et al. |
| 2008/0152122 A1 | 6/2008 | Idan et al. |
| 2008/0181389 A1 | 7/2008 | Bourne et al. |
| 2008/0199000 A1 | 8/2008 | Su et al. |
| 2008/0205611 A1 | 8/2008 | Jordan et al. |
| 2008/0267386 A1 | 10/2008 | Cooper |
| 2008/0273687 A1 | 11/2008 | Knott et al. |
| 2009/0043670 A1 | 2/2009 | Johansson et al. |
| 2009/0086933 A1 | 4/2009 | Patel et al. |
| 2009/0190740 A1 | 7/2009 | Chishti et al. |
| 2009/0190743 A1 | 7/2009 | Spottiswoode |
| 2009/0190744 A1 | 7/2009 | Xie et al. |
| 2009/0190745 A1 | 7/2009 | Xie et al. |
| 2009/0190746 A1 | 7/2009 | Chishti et al. |
| 2009/0190747 A1 | 7/2009 | Spottiswoode |
| 2009/0190748 A1 | 7/2009 | Chishti et al. |
| 2009/0190749 A1 | 7/2009 | Xie et al. |
| 2009/0190750 A1 | 7/2009 | Xie et al. |
| 2009/0232294 A1 | 9/2009 | Xie et al. |
| 2009/0234710 A1 | 9/2009 | Belgaied Hassine et al. |
| 2009/0245493 A1 | 10/2009 | Chen et al. |
| 2009/0304172 A1 | 12/2009 | Becerra et al. |
| 2009/0318111 A1 | 12/2009 | Desai et al. |
| 2009/0323921 A1 | 12/2009 | Spottiswoode et al. |
| 2010/0020959 A1 | 1/2010 | Spottiswoode |
| 2010/0020961 A1 | 1/2010 | Spottiswoode |
| 2010/0054431 A1 | 3/2010 | Jaiswal et al. |
| 2010/0054452 A1 | 3/2010 | Afzal |
| 2010/0054453 A1 | 3/2010 | Stewart |
| 2010/0086120 A1 | 4/2010 | Brussat et al. |
| 2010/0111285 A1 | 5/2010 | Chishti |
| 2010/0111286 A1 | 5/2010 | Chishti |
| 2010/0111287 A1 | 5/2010 | Xie et al. |
| 2010/0111288 A1 | 5/2010 | Afzal et al. |
| 2010/0142698 A1 | 6/2010 | Spottiswoode et al. |
| 2010/0158238 A1 | 6/2010 | Saushkin |
| 2010/0183138 A1 | 7/2010 | Spottiswoode et al. |
| 2011/0022357 A1 | 1/2011 | Vock et al. |
| 2011/0031112 A1 | 2/2011 | Birang et al. |
| 2011/0069821 A1 | 3/2011 | Korolev et al. |
| 2011/0125048 A1 | 5/2011 | Causevic et al. |
| 2012/0051536 A1 | 3/2012 | Chishti et al. |
| 2012/0051537 A1 | 3/2012 | Chishti et al. |
| 2012/0224680 A1 | 9/2012 | Spottiswoode et al. |
| 2012/0278136 A1 | 11/2012 | Flockhart et al. |
| 2013/0003959 A1 | 1/2013 | Nishikawa et al. |
| 2013/0151388 A1 | 6/2013 | Falkenborg et al. |
| 2013/0251137 A1 | 9/2013 | Chishti et al. |
| 2013/0287202 A1 | 10/2013 | Flockhart et al. |
| 2014/0044246 A1 | 2/2014 | Klemm et al. |
| 2014/0079210 A1 | 3/2014 | Kohler et al. |
| 2014/0119531 A1 | 5/2014 | Tuchman et al. |
| 2014/0119533 A1 | 5/2014 | Spottiswoode et al. |
| 2014/0140498 A1 | 5/2014 | Mezhibovsky et al. |
| 2014/0280899 A1 | 9/2014 | Brewster, Jr. et al. |
| 2014/0341370 A1 | 11/2014 | Li et al. |
| 2015/0055772 A1 | 2/2015 | Klemm et al. |
| 2015/0281448 A1 | 10/2015 | Putra et al. |
| 2015/0347950 A1 | 12/2015 | Goyal et al. |
| 2016/0080573 A1 | 3/2016 | Chishti |
| 2017/0155769 A1 | 6/2017 | Kan et al. |

FOREIGN PATENT DOCUMENTS

| | | |
|---|---|---|
| AU | 2009311534 B2 | 8/2014 |
| CN | 101093590 A | 12/2007 |
| CN | 102390184 A | 3/2012 |
| CN | 102555536 A | 7/2012 |
| CN | 202965525 U | 6/2013 |
| CN | 203311505 U | 11/2013 |
| CN | 102301688 B | 5/2014 |
| CN | 102017591 B | 11/2014 |
| EP | 0493292 A2 | 7/1992 |
| EP | 0949793 A1 | 10/1999 |
| EP | 1032188 A1 | 8/2000 |
| EP | 1335572 A2 | 8/2003 |
| JP | 11-098252 A | 4/1999 |
| JP | 2000-069168 A | 3/2000 |
| JP | 2000-078291 A | 3/2000 |
| JP | 2000-078292 A | 3/2000 |
| JP | 2000-092213 A | 3/2000 |
| JP | 2000-236393 A | 8/2000 |
| JP | 2001-292236 A | 10/2001 |
| JP | 2001-518753 A | 10/2001 |
| JP | 2002-297900 A | 10/2002 |
| JP | 3366565 B2 | 1/2003 |
| JP | 2003-187061 A | 7/2003 |
| JP | 2004-056517 A | 2/2004 |
| JP | 2004-227228 A | 8/2004 |
| JP | 2006-345132 A | 12/2006 |
| JP | 2007-324708 A | 12/2007 |
| JP | 2011-511533 A | 4/2011 |
| JP | 2011-511536 A | 4/2011 |
| JP | 5421928 B2 | 2/2014 |

(56) References Cited

FOREIGN PATENT DOCUMENTS

| | | |
|---|---|---|
| JP | 5631326 B2 | 11/2014 |
| JP | 5649575 B2 | 1/2015 |
| JP | 2015-514371 A | 5/2015 |
| MX | 316118 | 12/2013 |
| MX | 322251 | 7/2014 |
| NZ | 587100 B | 10/2013 |
| NZ | 587101 B | 10/2013 |
| NZ | 591486 B | 1/2014 |
| NZ | 592781 B | 3/2014 |
| PH | 2010-501704 | 2/2014 |
| PH | 2010-501705 | 2/2015 |
| WO | WO-1999/17517 A1 | 4/1999 |
| WO | WO-2001/063894 A2 | 8/2001 |
| WO | WO-2006/124113 A2 | 11/2006 |
| WO | WO-2009/097018 A1 | 8/2009 |
| WO | WO-2010/053701 A2 | 5/2010 |
| WO | WO-2011/081514 A1 | 7/2011 |

OTHER PUBLICATIONS

Anonymous. (2006) "Performance Based Routing in Profit Call Centers," The Decision Makers' Direct, located at www.decisioncraft.com, Issue Jun. 2002 (3 pages).

Cleveland, William S., "Robust Locally Weighted Regression and Smoothing Scatterplots," Journal of the American Statistical Association, vol. 74, No. 368, Dec. 1979, pp. 829-836 (8 pages).

Gans, N. et al. (2003), "Telephone Call Centers: Tutorial, Review and Research Prospects," Manufacturing & Service Operations Management, vol. 5, No. 2, pp. 79-141.

Ioannis Ntzoufras "Bayesian Modeling Using Winbugs an Introduction", Department of Statistics, Athens University of Economics and Business, Wiley-Interscience, A John Wiley & Sons, Inc., Publication, Chapter 5, Jan. 1, 2007, pp. 155-220 (67 pages).

Koole, G. (2004). "Performance Analysis and Optimization in Customer Contact Centers," Proceedings of the Quantitative Evaluation of Systems, First International Conference, Sep. 27-30, 2004 (4 pages).

Koole, G. et al. (Mar. 6, 2006). "An Overview of Routing and Staffing Algorithms in Multi-Skill Customer Contact Centers," Manuscript, 42 pages.

Ntzoufras, "Bayesian Modeling Using Winbugs". Wiley Interscience, Chapter 5, Normal Regression Models, Oct. 18, 2007, Redacted version, pp. 155-220 (67 pages).

Press, W. H. and Rybicki, G. B., "Fast Algorithm for Spectral Analysis of Unevenly Sampled Data," The Astrophysical Journal, vol. 338, Mar. 1, 1989, pp. 277-280 (4 pages).

Riedmiller, M. et al. (1993). "A Direct Adaptive Method for Faster Back Propagation Learning: The RPROP Algorithm," 1993 IEEE International Conference on Neural Networks, San Francisco, CA, Mar. 28-Apr. 1, 1993, 1:586-591.

Stanley et al., "Improving call center operations using performance-based routing strategies," Calif. Journal of Operations Management, 6(1), 24-32, Feb. 2008; retrieved from http://userwww.sfsu.edu/saltzman/Publist.html.

Task Assignment Model
300A

|  | $a_0$ | $a_1$ | $a_2$ |
|---|---|---|---|
| $t_2$ | $g(a_0, t_2)$ | $g(a_1, t_2)$ | $g(a_2, t_2)$ |
| $t_1$ | $g(a_0, t_1)$ | $g(a_1, t_1)$ | $g(a_2, t_1)$ |
| $t_0$ | $g(a_0, t_0)$ | $g(a_1, t_0)$ | $g(a_2, t_0)$ |

FIG. 3A

Contact Pairing Model
300B

Task Assignment Payout Matrix
500

|       | $a_0$ | $a_1$ | $a_2$ |
|-------|-------|-------|-------|
| $t_2$ | 0     | 0.5   | 1     |
| $t_1$ | 0     | 1     | 0     |
| $t_0$ | 1     | 0     | 0.5   |

FIG. 5

TECHNIQUES FOR ESTIMATING EXPECTED PERFORMANCE IN A TASK ASSIGNMENT SYSTEM

CROSS-REFERENCE TO RELATED APPLICATIONS

This application is a continuation of U.S. patent application Ser. No. 16/527,588, filed Jul. 31, 2019, which is a continuation of U.S. patent application Ser. No. 16/173,997, filed Oct. 29, 2018, now U.S. Pat. No. 10,375,246, which is a continuation of U.S. patent application Ser. No. 15/648,788, filed Jul. 13, 2017, now U.S. Pat. No. 10,116,795, which is a continuation of U.S. patent application Ser. No. 15/645,277, filed Jul. 10, 2017, now U.S. Pat. No. 10,122,860, each of which is hereby incorporated by reference in its entirety as if fully set forth herein.

FIELD OF THE DISCLOSURE

This disclosure generally relates to performance in a task assignment system, and, more particularly, to techniques for estimating expected performance of task assignment strategies in a task assignment system.

BACKGROUND OF THE DISCLOSURE

A typical task assignment system assigns a finite number of tasks to a finite number of workers ("agents") over a period of time. One example of a task assignment system is a contact center (e.g., a call center). In a call center, a finite number of agents are available during a given shift or other period of time, and a finite number of callers call into the call center during the shift. Each caller, with various needs and reasons for calling, represents a task assigned to one of the call center agents.

A typical task assignment strategy determines which tasks are assigned to which agents. Typically, a task assignment strategy is derived from insights that certain types of agents perform better with certain types of tasks, and these agents are assigned specific tasks based on these insights. In the example of a call center, the insight may be that agents skilled at sales should be preferentially assigned to sales queues of callers seeking to make a purchase, while agents skilled at technical support should be preferentially assigned to technical support queues of callers seeking a solution to a technical problem.

Although typical task assignment strategies may be effective at improving the performance of typical task assignment systems in some instances, in other instances they may have no substantial impact on performance at best or degrade performance at worst. Typically, instances under which typical task assignment strategies may be ineffective are those that do not account for the comparative advantage of agents assigned to different types of tasks.

In view of the foregoing, it may be understood that there may be a need for a system that enables estimation of the expected performance of different task assignment strategies for the assignment of a finite number of tasks to a finite number of agents over a period of time in a task assignment system.

SUMMARY OF THE DISCLOSURE

Techniques for estimating expected performance of a task assignment strategy in a task assignment system are disclosed. In one particular embodiment, the techniques may be realized as a method comprising receiving, by at least one computer processor communicatively coupled to a task assignment system, a plurality of historical agent task assignments; determining, by the at least one computer processor, a sample of the plurality based on a strategy for pairing agents with tasks; determining, by the at least one computer processor, an expected performance of the strategy based on the sample; outputting, by the at least one computer processor, the expected performance; and optimizing, by the at least one computer processor, the performance of the task assignment system based on the expected performance.

In accordance with other aspects of this particular embodiment, the task assignment system may be a contact center, and wherein the strategy may assign contacts to contact center agents.

In accordance with other aspects of this particular embodiment, the method may further comprise oversampling, by the at least one computer processor, the plurality of historical agent task assignments by determining a plurality of samples comprising at least one overlapping historical agent task assignment of the plurality of historical agent task assignments.

In accordance with other aspects of this particular embodiment, the method may further comprise determining, by the at least one computer processor, a bias in the sample; and accounting, by the at least one computer processor, for the bias in the expected performance.

In accordance with other aspects of this particular embodiment, the bias may be attributable to an overrepresentation of a subset of agents in the sample or an overrepresentation of a subset of task types in the sample.

In accordance with other aspects of this particular embodiment, determining the expected performance may comprise determining, by the at least one computer processor, a plurality of samples of the plurality of historical agent task assignments.

In accordance with other aspects of this particular embodiment, the method may further comprise partitioning, by the at least one computer processor, the plurality of historical agent task assignments into a first subset of historical agent task assignments and a holdout subset of historical agent task assignments different from the first subset; and generating, by the at least one computer processor, the strategy based on the first subset, wherein the sample is a subset of the holdout subset, and wherein determining the expected performance is based on the holdout subset.

In accordance with other aspects of this particular embodiment, the method may further comprise over-representing in the holdout subset historical agent task assignments attributable to a second strategy for pairing agents with tasks different from the strategy.

In accordance with other aspects of this particular embodiment, determining the expected performance may be based on a plurality of holdout subsets.

In accordance with other aspects of this particular embodiment, the method may further comprise determining a standard error associated with the expected performance based on the plurality of holdout subsets.

In accordance with other aspects of this particular embodiment, the sample may be associated with an amount of performance difference between expected performance of the sample and peak performance of the strategy.

In another particular embodiment, the techniques may be realized as a system comprising at least one computer processor communicatively coupled to a task assignment system, wherein the at least one computer processor is configured to perform the steps in the above-discussed method.

In another particular embodiment, the techniques may be realized as an article of manufacture comprising a non-transitory processor readable medium and instructions stored on the medium, wherein the instructions are configured to be readable from the medium by at least one computer processor communicatively coupled to a task assignment system and thereby cause the at least one computer processor to operate to perform the steps in the above-discussed method.

In another particular embodiment, the techniques may be realized as a method comprising: receiving, by at least one computer processor communicatively coupled to a task assignment system, a plurality of historical agent task assignments; determining, by the at least one computer processor, a weighting of at least one of the plurality based on a strategy for pairing agents with tasks; determining, by the at least one computer processor, an expected performance of the strategy based on the weighting; and outputting, by the at least one computer processor, the expected performance, wherein the expected performance of the strategy demonstrates that performance of a task assignment system may be optimized if the task assignment system is configured to use the strategy.

In accordance with other aspects of this particular embodiment, the task assignment system may be a contact center, and wherein the strategy assigns contacts to contact center agents.

In accordance with other aspects of this particular embodiment, at least one weighting may be zero or epsilon.

In accordance with other aspects of this particular embodiment, the method may further comprise determining, by the at least one computer processor, a bias in the sample; and accounting, by the at least one computer processor, for the bias in the expected performance.

In accordance with other aspects of this particular embodiment, the bias may be attributable to an overweighting of a subset of agents or an overweighting of a subset of task types.

In accordance with other aspects of this particular embodiment, determining the expected performance comprises combining at least two weighted outcomes corresponding to at least two weighted pairings in the sample.

In another particular embodiment, the techniques may be realized as a system comprising at least one computer processor communicatively coupled to a task assignment system, wherein the at least one computer processor is configured to perform the steps in the above-discussed method.

In another particular embodiment, the techniques may be realized as an article of manufacture comprising a non-transitory processor readable medium and instructions stored on the medium, wherein the instructions are configured to be readable from the medium by at least one computer processor communicatively coupled to a task assignment system and thereby cause the at least one computer processor to operate to perform the steps in the above-discussed method.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

To facilitate a fuller understanding of the present disclosure, reference is now made to the accompanying drawings, in which like elements are referenced with like numerals. These drawings should not be construed as limiting the present disclosure, but are intended to be illustrative only.

FIG. 3A depicts a schematic representation of a task assignment model according to embodiments of the present disclosure.

FIG. 5 shows a schematic representation of a task assignment payout matrix according to embodiments of the present disclosure.

DETAILED DESCRIPTION

A typical task assignment system assigns a finite number of tasks to a finite number of workers ("agents") over a period of time. One example of a task assignment system is a contact center (e.g., a call center). In a call center, a finite number of agents are available during a given shift or other period of time, and a finite number of callers call into the call center during the shift. Each caller, with various needs and reasons for calling, represents a task assigned to one of the call center agents.

A typical task assignment strategy determines which tasks are assigned to which agents. Typically, a task assignment strategy is derived from insights that certain types of agents perform better with certain types of tasks, and these agents are assigned specific tasks based on these insights. In the example of a call center, the insight may be that agents skilled at sales should be preferentially assigned to sales queues of callers seeking to make a purchase, while agents skilled at technical support should be preferentially assigned to technical support queues of callers seeking a solution to a technical problem.

Although typical task assignment strategies may be effective at improving the performance of typical task assignment systems in some instances, in other instances they may have no substantial impact on performance at best or degrade performance at worst. Typically, instances under which typical task assignment strategies may be ineffective are those that do not account for the comparative advantage of agents assigned to different types of tasks. A general description of comparative advantage may be found in, e.g., Cowen and Tabarrok, *Modern Principles: Microeconomics,* 2d ed. (2011) at pp. 16-19, which is hereby incorporated by reference herein.

In view of the foregoing, it may be understood that there is a need for a system that enables estimation of the expected performance of different task assignment strategies for the assignment of a finite number of tasks to a finite number of agents over a period of time in a task assignment system.

Figure 1:
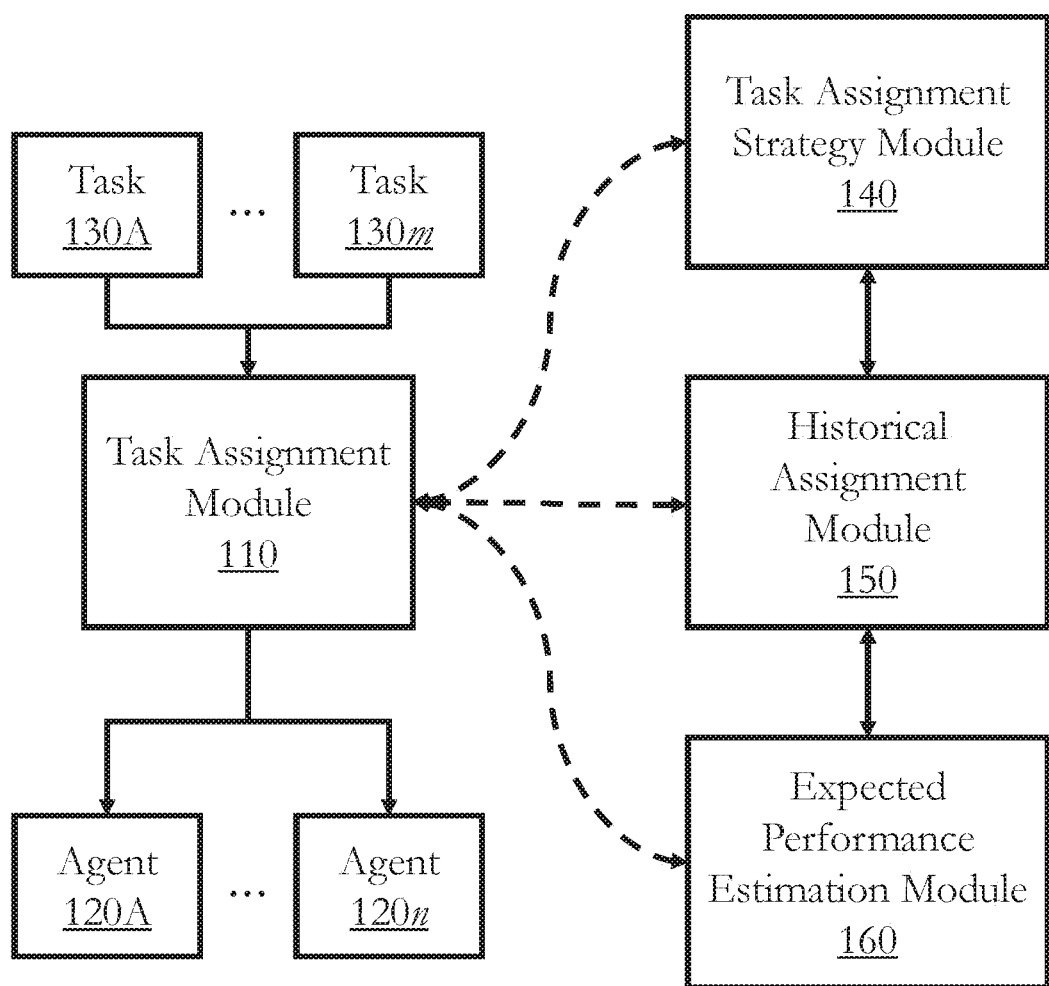
FIG. 1 shows a block diagram of a task assignment system according to embodiments of the present disclosure.

FIG. 1 shows a block diagram of a task assignment system 100 according to embodiments of the present disclosure. The description herein describes network elements, computers, and/or components of a system and method for estimating expected performance in a task assignment system that may include one or more modules. As used herein, the term "module" may be understood to refer to computing software, firmware, hardware, and/or various combinations thereof. Modules, however, are not to be interpreted as software that is not implemented on hardware, firmware, or recorded on a non-transitory processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

As shown in FIG. 1, the task assignment system 100 may include a task assignment module 110. The task assignment system 100 may include a switch or other type of routing hardware and software for helping to assign tasks among various agents, including queuing or switching components or other Internet-, cloud-, or network-based hardware or software solutions.

The task assignment module 110 may receive incoming tasks. In the example of FIG. 1, the task assignment system 100 receives m tasks over a given period, tasks 130A-130m. Each of the m tasks may be assigned to an agent of the task assignment system 100 for servicing or other types of task processing. In the example of FIG. 1, n agents are available during the given period, agents 120A-120n. m and n may be arbitrarily large finite integers greater than or equal to one. In a real-world task assignment system, such as a contact center, there may be dozens, hundreds, etc. of agents logged into the contact center to interact with contacts during a shift, and the contact center may receive dozens, hundreds, thousands, etc. of contacts (e.g., calls) during the shift.

In some environments, known as "L0" environments, one of the m tasks (e.g., task 130A) may be ready for assignment to an agent, and one of the n agents (e.g., agent 120A) may be ready to receive an assigned task. In an L0 environment, there is no choice of task or agent available, and a task assignment strategy may assign task 130A to agent 130A.

In other environments, known as "L1" environments, one of the m tasks (e.g., task 130A) may be ready for assignment to an agent, and multiple agents (e.g., agent 120A and 120B) may be ready to receive an assigned task. In an L1 environment, there is a choice among multiple available agents, and a task assignment strategy may assign task 130A to either agent 120A or 120B.

In yet other environments, known as "L2" environments, multiple tasks (e.g., tasks 130A and 130B) may be ready assignment to an agent, and one of the n agents (e.g., agent 120A) may be ready to receive an assigned task. In an L2 environment, there is a choice among multiple available tasks, and a task assignment strategy may assign either task 130A or 130B to agent 120A.

In still other environments, known as "L3" environments, multiple tasks (e.g., tasks 130A and 130B) may be ready assignment to an agent, and multiple agents (e.g., agent 120A and 120B) may be ready to receive an assigned task. In an L3 environment, there is a choice among multiple available agents and tasks, and a task assignment strategy may pair off some or all of the available tasks to some or all of the available agents (e.g., in a sequence of assignments or a single batch assignment).

These environments L0-L3, and various transitions among them, are described in detail for the contact center context in, e.g., U.S. patent application Ser. No. 15/395,469, which is hereby incorporated by reference herein.

In some embodiments, a task assignment strategy module 140 may be communicatively coupled to and/or configured to operate in the task assignment system 100. The task assignment strategy module 140 may implement one or more task assignment strategies (or "pairing strategies") for assigning individual tasks to individual agents (e.g., pairing contacts with contact center agents).

A variety of different task assignment strategies may be devised and implemented by the task assignment strategy module 140. In some embodiments, a first-in/first-out ("FIFO") strategy may be implemented in which, for example, the longest-waiting agent receives the next available task (in L1 environments) or the longest-waiting task is assigned to the next available task (in L2 environments). Other FIFO and FIFO-like strategies may make assignments without relying on information specific to individual tasks or individual agents.

In other embodiments, a performance-based routing (PBR) strategy may be used for prioritizing higher-performing agents for task assignment may be implemented. Under PBR, for example, the highest-performing agent among available agents receives the next available task. Other PBR and PBR-like strategies may make assignments using information about specific agents but without necessarily relying on information about specific tasks or agents.

In yet other embodiments, a behavioral pairing (BP) strategy may be used for optimally assigning tasks to agents using information about both specific tasks and specific agents. Various BP strategies may be used, such as a diagonal model BP strategy or a network flow BP strategy. These task assignment strategies and others are described in detail for the contact center context in, e.g., U.S. Pat. No. 9,300,802 and U.S. patent application Ser. No. 15/582,223, which are hereby incorporated by reference herein.

In some embodiments, a historical assignment module 150 may be communicatively coupled to and/or configured to operate in the task assignment system 100 via other modules such as the task assignment module 110 and/or the task assignment strategy module 140. The historical assignment module 150 may be responsible for various functions such as monitoring, storing, retrieving, and/or outputting information about agent task assignments that have already been made. For example, the historical assignment module 150 may monitor the task assignment module 110 to collect information about task assignments in a given period. Each record of a historical task assignment may include information such as an agent identifier, a task and/or task type identifier, and outcome information.

In some embodiments and for some contexts, additional information may be stored. For example, in a call center context, the historical assignment module 150 may also store information about the time a call started, the time a call ended, the phone number dialed, and the caller's phone number. For another example, in a dispatch center (e.g., "truck roll") context, the historical assignment module 150 may also store information about the time a driver (i.e., field agent) departs from the dispatch center, the route recommended, the route taken, the estimated travel time, the actual travel time, the amount of time spent at the customer site handling the customer's task, etc.

In some embodiments, the historical assignment module 150 may generate a pairing model or similar computer processor-generate model based on a set of historical assignments for a period of time (e.g., the past week, the past month, the past year, etc.), which may be used by the task assignment strategy module 140 to make task assignment recommendations or instructions to the task assignment module 110. In other embodiments, the historical assignment module 150 may send historical assignment information to another module such as the task assignment strategy module 140 or the expected performance estimation module 160 to generate a pairing model and/or a pairing strategy based on a pairing model.

In some embodiments, an expected performance estimation module 160 may be communicatively coupled to and/or configured to operate in the task assignment system 100 via other modules such as the task assignment module 110 and/or the historical assignment module 150. The expected performance estimation module 160 may estimate the expected performance of a task assignment strategy (e.g., in conjunction with a pairing model) using historical assignment information, which may be received from, for example, the historical assignment module 150. The techniques for estimating expected performance and other functionality performed by the expected performance estimation module 160 for various task assignment strategies and various contexts are described in later sections throughout the present disclosure.

In some embodiments, the expected performance estimation module 160 may output or otherwise report or use the estimated expected performance. The estimated expected performance may be used to assess the quality of the task assignment strategy to determine, for example, whether a different task assignment strategy (or a different pairing model) should be used, or to predict the expected overall performance (or performance gain) that may be achieved within the task assignment system 100 when it is optimized or otherwise configured to use the task assignment strategy.

As noted above, a variety of contexts may use embodiments similar to the task assignment system 100, including but not limited to contact centers and dispatch centers. One such example for contact centers is described below with reference to FIG. 2.

Figure 2:
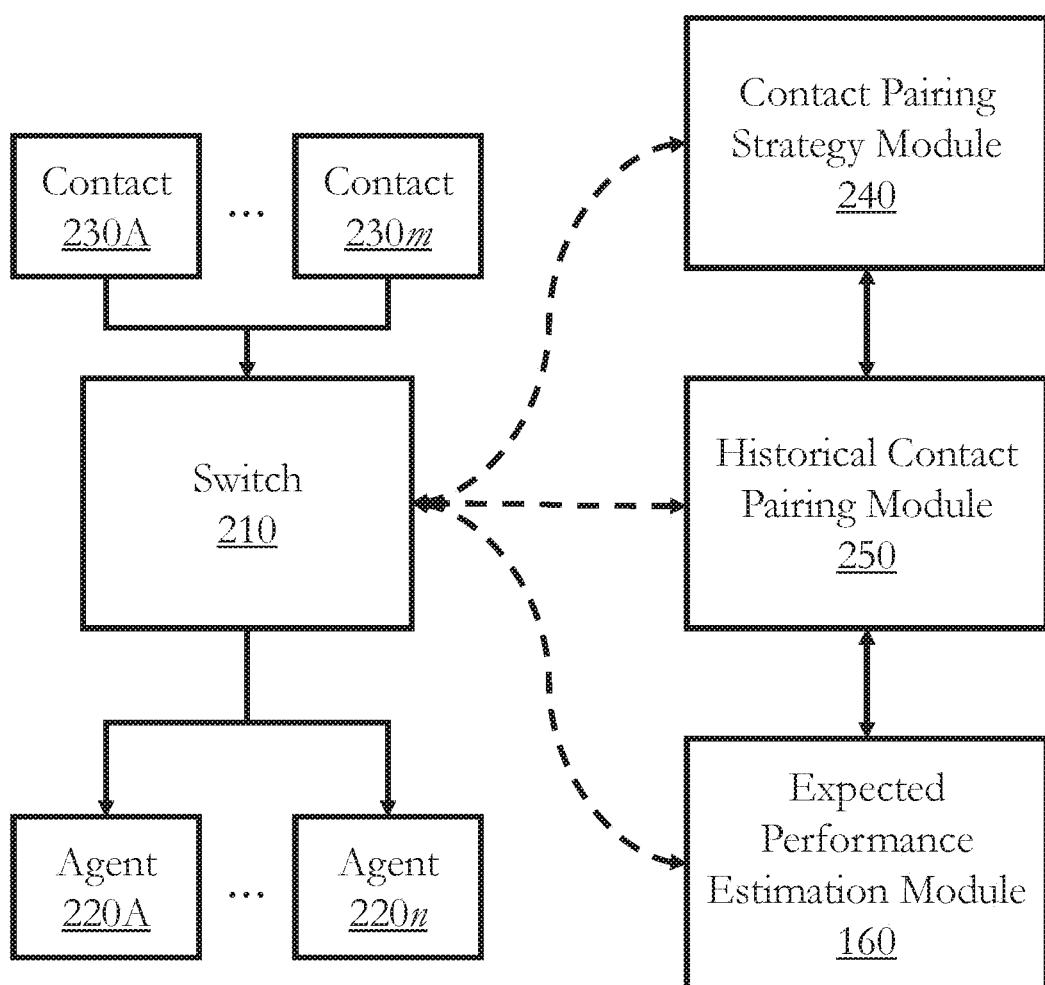
FIG. 2 shows a block diagram of a contact center according to embodiments of the present disclosure.

FIG. 2 shows a block diagram of a contact center 200 according to embodiments of the present disclosure. Contact center 200 is similar to the task assignment system 100 (FIG. 1) insofar as it is a specialized context for assigning tasks (namely, "contacts") to agents in the contact center. In an inbound environment, contacts call or otherwise connect to a switch or other component of the contact center 200 (via, e.g., live text chat, video chat, email, social media). In an outbound environment, contacts may call (or call back) or otherwise be connected via an outbound dialer or other component of the contact center 200 and contemporaneously or subsequently assigned to an agent.

Similar to the task assignment system 100, contact center 200 has n agents 220A-220n and m contacts 230A-230m that arrive for assignment to the agents over a given period. Switch 210 or a similar routing component such as a PBX/ACD or load balancer may connect individual contacts to individual agents.

Similar to task assignment strategy module 140, a contact pairing strategy module 240 (e.g., a BP module and/or a benchmarking module) may make pairing recommendations or instructions to the Switch 210 in accordance with a contact pairing strategy.

Figure 3B:
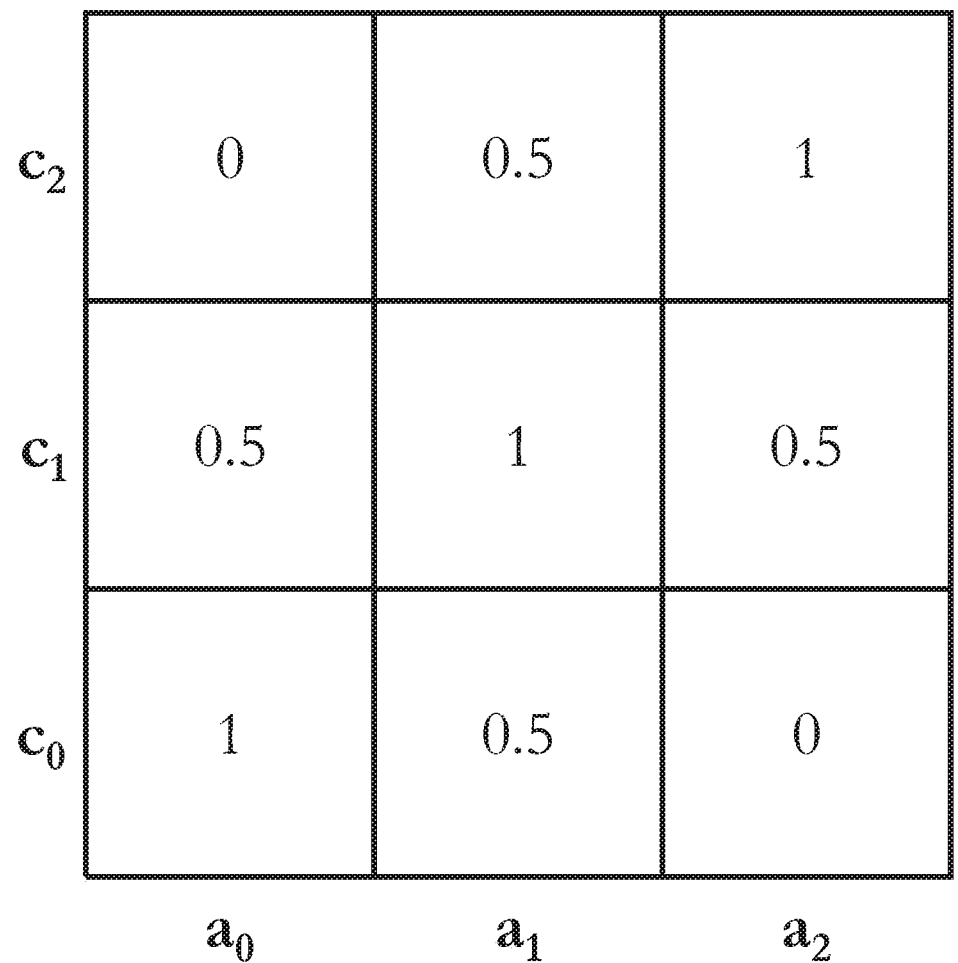
FIG. 3B depicts a schematic representation of a contact pairing model according to embodiments of the present disclosure.

Similar to historical assignment module 150, a historical contact pairing module 250 may monitor, store, retrieve, and/or output information about agent contact pairings that have already been made. The historical contact pairing module 250 may generate a pairing model, which may be used by the contact pairing strategy module 240 to make task assignment recommendations or instructions to the switch 210. In other embodiments, the historical contact pairing module 250 may send historical assignment information to another module such as the contact pairing strategy module 240 or the expected performance estimation module 160 to generate a pairing model for use with a pairing strategy. FIGS. 3A and 3B, described in detail below, depict examples of such pairing models for simplified task assignment systems.

FIG. 3A depicts a schematic representation of a task assignment model 300A according to embodiments of the present disclosure. The task assignment model 300A models a simple task assignment system for illustrative purposes with three agents $a_0$-$a_2$ and three task types $t_0$-$t_2$. In some embodiments, agents and/or task types may be ordered according to some information about the agents or the task types (e.g., a diagonal BP model). In other embodiments, the agents and task types may appear in the model without a particular ordering (e.g., a payout matrix or a network flow BP model).

In the task assignment model 300A, each cell represents a possible assignment of a particular task type $t_i$ with a particular agent $a_k$. Each cell contains an interaction term (function) $g(a_k, t_i)$ for the agent and task type. For example, an assignment of task type $t_1$ to agent $a_2$ is shown to have an interaction term of $g(a_2, t_1)$. The specific functional definition of any given interaction term depends on the task assignment strategy to be used, the context for the task assignment system, the data available for the given agent and task type used to construct the task assignment model 300A, etc.

In some embodiments, the interaction term may represent a cost or value of a particular pairing (e.g., expected conversion rate in a sales queue, expected customer satisfaction rating in a customer support queue, expected cost of a truck roll in a dispatch center, etc.). In each case, the expected value may be estimated or otherwise determined using a combination of information about the agent and the type of task.

FIG. 3B depicts a schematic representation of a contact pairing model 300B according to embodiments of the present disclosure. Like the task assignment model 300A (FIG. 3A), the contact pairing model 300B models a simple contact center for illustrative purposes with three agents $a_0$-$a_2$ and three contact types $c_0$-$c_2$, which may be the tasks in a contact center context. Each cell of the contact pairing model 300B indicates the value of the interaction term for each possible pairing of individual agents and contact types. The contact pairing model 300B may be suitable for a diagonal BP strategy as described in, e.g., U.S. Pat. No. 9,300,802, which was previously incorporated by reference herein.

Consistent with a diagonal model, the preferred pairings fall along the equivalent of a "y=x" 45° diagonal line through the contact pairing model 300B, namely: $a_0$ with $c_0$, $a_1$ with $c_1$, and $a_2$ with $c_2$. Each of these cells found along the diagonal is shown to have an interaction term that evaluates to 1.

In some situations, optimal choice of agents (L1) or contacts (L2) is not always available to select the preferred agent for every contact (L1) or to select the preferred contact for every agent (L2). In situations with limited choice, the pairing strategy may select the best-available option. For example, the next best pairings as shown in the contact pairing model 300B are in the cells relatively close to the y=x diagonal. Each of these cells is shown to have an interaction term that evaluates to 0.5. Moving farther still from the ideal diagonal pairs are the least-preferred pairs: $a_0$ with $c_2$ and $a_2$ with $c_0$, both of which have interaction terms that evaluate to 0.

A pairing model such as contact pairing model 300B for a contact center is one example context for a task assignment system. Other contexts mentioned above included a repair technician dispatched on a truck roll from a dispatch center, and a consulting associate tasked to a specific project by her consulting firm. More examples of contexts include case assignments (e.g., insurance claims) to agents (e.g., insurance claim adjusters), and recognizing retail customers for pairing with individual salesclerks in a retail store. These contexts serve as example task assignment systems, and embodiments of the present disclosure are not limited to these contexts.

Unlike task assignment model 300A and contact pairing model 300B, typical work assignment strategies assign workers (or "agents") to tasks based on potentially naïve intuitions. For example, in a contact center, tasks may be assigned to an agent based on agent performance (e.g., PBR). Similarly, a repair technician may be assigned a truck route calculated to minimize the length of the truck route. As another example, a consulting firm might assign an associate to a specific project based on the associate's tenure.

In all these cases, what is lacking is an assessment of the effect of assignment of an individual worker to an individual task on the remainder of the workers and tasks within an overall system. For example, in a contact center environment, assignment of one task to a high-performing agent may necessitate assigning a different task to a low-performing agent, without due regard for the types of tasks being assigned to high- and low-performing agents. In aggregate the entire contact center's performance may be reduced. Similarly, assigning a certain route to a repair technician may result in assignments of other routes to other repair technicians such that the overall system performance may be reduced.

As a result, while an individual agent may indeed perform well with an assigned task, another agent assigned a residual task may perform materially worse. Counterintuitively, attempting to optimize each task assignment independently may, in fact, lower the overall performance of the task assignment system rather than increase it.

Embodiments of this disclosure provide techniques for more accurately estimating the performance of task assignment strategies. The techniques assign tasks to agents in a manner that accounts for the cumulative effect of subsequent assignments over a period of time to optimize overall system performance rather than optimizing the performance if any individual assigned task. For example, the task assignment strategy may leverage a comparative advantage of using some agents for some types of tasks while using other agents for other types of tasks.

FIGS. 4A-4K show schematic representations of expected performance estimations for task assignment strategies, stepping through several techniques for estimating performance estimation. These examples primarily depict estimating expected performance of a diagonal model BP strategy in a task assignment system under different conditions. The techniques use historical task assignment data to estimate expected performance and validate the strategy.

Figure 4A:
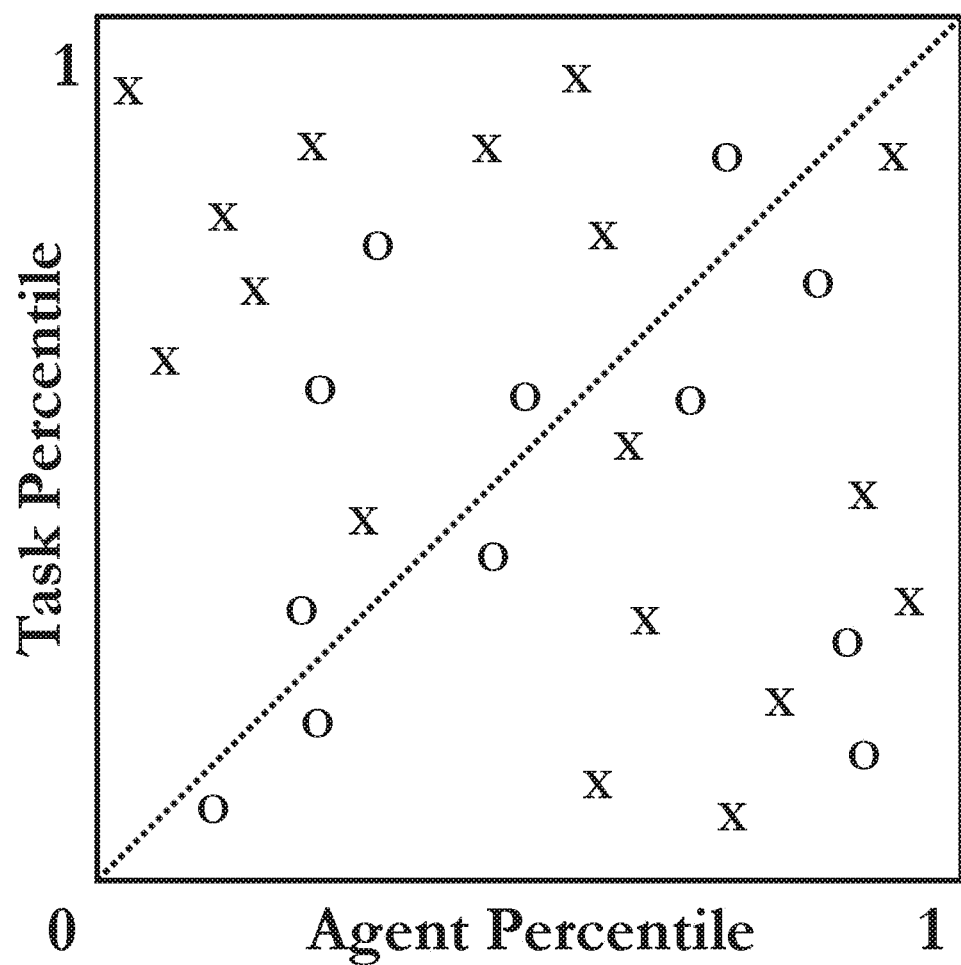
FIG. 4A shows a schematic representation of a task assignment strategy expected performance estimation according to embodiments of the present disclosure.
Figure 4B:
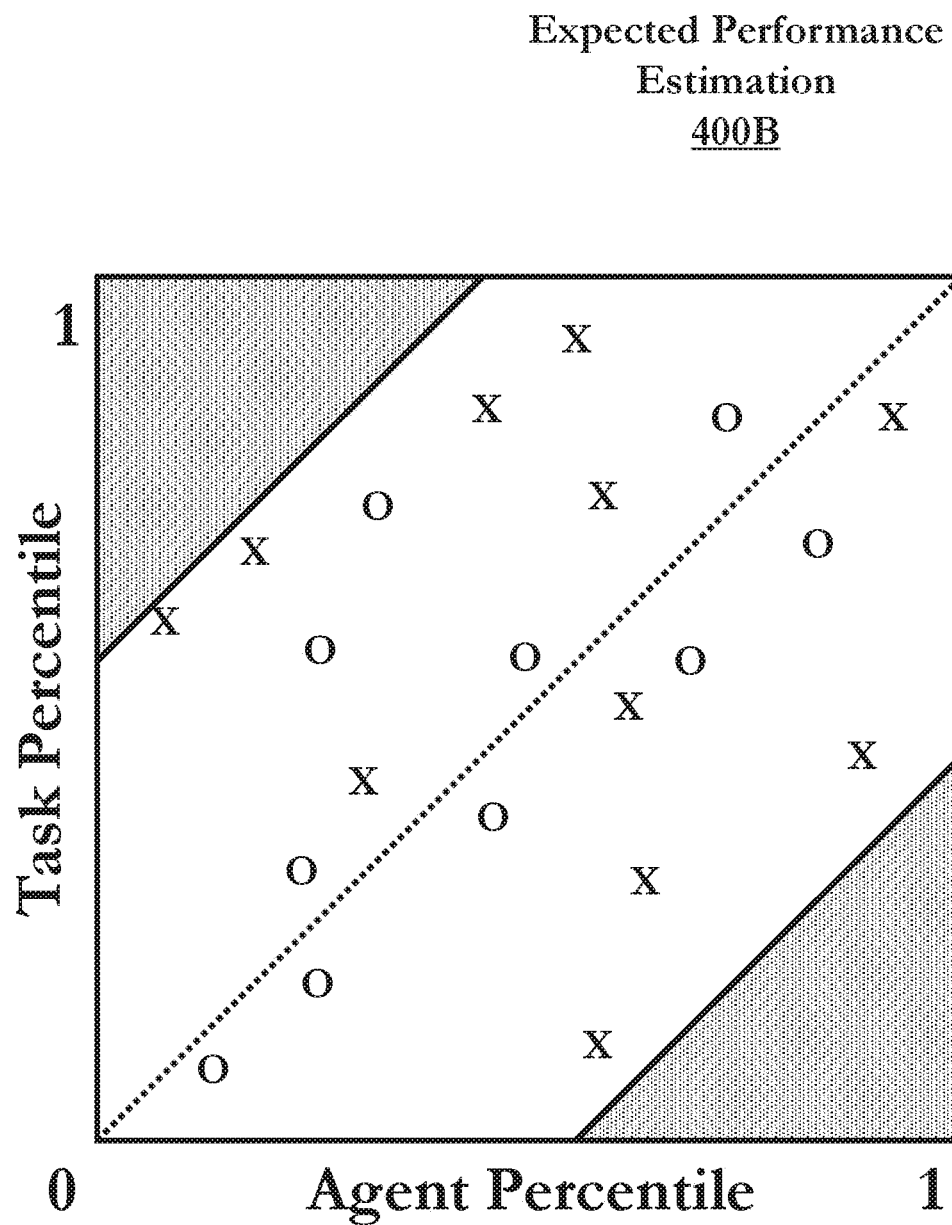
FIG. 4B shows a schematic representation of a task assignment strategy expected performance estimation according to embodiments of the present disclosure.
Figure 4C:
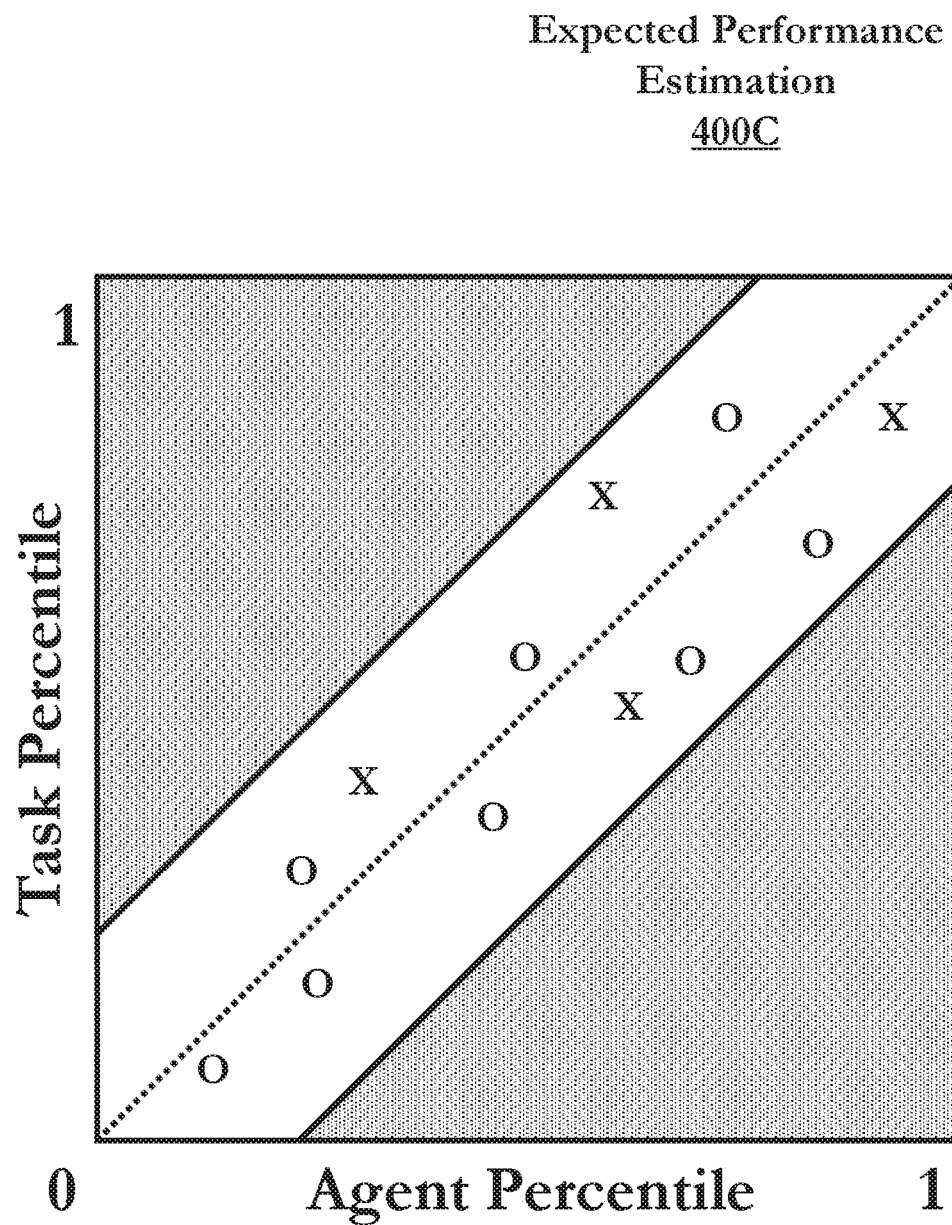
FIG. 4C shows a schematic representation of a task assignment strategy expected performance estimation according to embodiments of the present disclosure.

Specifically, as described in more detail below, FIGS. 4A-4C illustrate a validation technique for estimating expected performance of a diagonal BP model using historical assignment data. FIGS. 4E and 4F accompany the explanation below for a technique for improving the accuracy of the estimation technique described with reference to FIGS. 4A-4C when there is an agent-selection bias in the underlying historical assignment data. FIGS. 4G and 4H accompany the explanation below for a technique for improving the accuracy of the estimation technique described with reference to FIGS. 4A-C when there is a task-selection bias in the underlying historical assignment data. FIGS. 4I and 4J accompany the explanation below for a technique to compare the estimated expected performance of the task assignment strategy being validated to the task assignment strategy that resulted in the underlying historical assignment data. Finally, FIG. 4K accompanies the explanation below for a technique to visualize the distribution of freedom of choice found in the underlying historical assignment data to improve the real-world expectations of an estimated expected performance of the task assignment strategy being validated.

FIG. 4A shows a schematic representation of a task assignment strategy expected performance estimation 400A according to embodiments of the present disclosure. In this task assignment system, there may be an arbitrary finite number of agents and task types. Under the BP strategy diagonal model, each agent may be assigned an agent percentile ranking between 0 and 1, and each task type may be assigned a task percentile ranking between 0 and 1. The ideal or optimal pairings, at which a diagonal BP strategy is expected to operate at peak performance with ideal choice, are shown as a dashed diagonal line along y=x (i.e., the line along which Task Percentile equals Agent Percentile).

Historical assignment data may be received. In the schematic representation of expected performance estimation 400A, each of the historical assignments is shown on a graph. Points indicated with the letter "O" represent pairings that had desirable outcomes, and points indicated with the letter "X" represent pairings that had undesirable outcomes. For example, in a contact center sales queue, an "O" may indicate a historical task in which a sale was made, and an "X" may indicate a historical task in which a sale was not made (a binomial outcome variable). In other examples, multinomial or continuous outcome variables may be used.

If a task assignment system uses a FIFO pairing strategy or another essentially random or relatively uniformly distributed pairing strategy, a set of historical assignments may be relatively uniformly distributed throughout a graph such as expected performance estimation 400A. In other words, under FIFO, there is an equal probability that a task for a given type may be assigned to any of the agents, with roughly equal utilization. Some historical assignments may appear close to the diagonal line (preferred pairings under the diagonal BP strategy), while other historical assignments may appear farther from the diagonal line (non-preferred pairings), and so on.

In expected performance estimation 400A, the full set of 29 historical assignments are shown. The set contains 12 pairings with desirable outcomes (the O's) and 17 pairings with undesirable outcomes (the X's). In some embodiments, the estimated expected performance of the baseline or underlying task assignment strategy (e.g., FIFO as in this example) may be computed as the proportion of desirable outcomes found in the set: 12/29≈41%.

A diagonal BP strategy seeks to improve upon other pairing strategies by preferentially pairing tasks to agents that are most similar in percentile ranking, such that if these pairs were plotted on a chart, they would lie as close as possible to the y=x diagonal line (i.e., Task Percentile=Agent Percentile).

In some embodiments, the expected performance of a task assignment strategy may be estimated (e.g., validated) using historical assignment data. In some embodiments, the validation may be performed using the same historical assignments used to construct the pairing model. In other embodiments, one set of historical assignments may be used to construct the pairing model, and a different set of historical assignments may be used to validate the model.

An insight for validating a task assignment strategy with historical assignment data is that the set of historical assignments can be sampled (or weighted, etc.) according to how likely it would have occurred had the task assignment system been running the pairing strategy being validated instead of the underlying pairing strategy that produced the historical assignments.

In the case of a diagonal BP strategy, there is a convenient geometric representation of a validation technique used in some embodiments and illustrated by FIGS. 4B and 4C. Namely, the closer a historical pairing lies to the ideal diagonal line, the more likely it is that such a historical pairing would have occurred using the diagonal BP strategy being validated. A partition may be established for excluding historical assignments from the sample that exceed a certain distance from the diagonal.

For a good diagonal pairing model, there should be proportionally more desirable outcomes within the sample as the acceptable distance (a threshold distance, or threshold "closeness of fit") for the sample approaches closer to the diagonal line. FIG. 4A shows the entire validation set of historical pairings, FIG. 4B shows a relatively large sample (relatively far acceptable/threshold distance from the diagonal), and FIG. 4C shows a relatively narrow sample (relatively short acceptable/threshold distance from the diagonal).

FIG. 4B shows a schematic representation of a task assignment strategy expected performance estimation 400B according to embodiments of the present disclosure. In expected performance estimation 400B, the plot of historical tasks is shown again, except two regions beyond a specified distance from the diagonal have been grayed out. In expected performance estimation 400B, the remaining sample contains 21 historical assignments, including 10 pairings with desirable outcomes (the O's). Therefore, the estimated expected performance of the diagonal BP strategy given this distance from the ideal, peak performance may be determined to be 10/21≈48%.

Comparing the expected performance of ≈48% to the underlying performance of ≈41% shown with reference to expected performance estimation 400A (FIG. 4A), the expected improvement (or expected "gain") provided by this diagonal BP strategy over the underlying strategy may be approximately 17%. This expected gain estimate assumes that the typical amount of (limited) choice available in this task assignment system tends to yield pairings distributed throughout this relatively wide band of pairings.

FIG. 4C shows a schematic representation of a task assignment strategy expected performance estimation 400C according to embodiments of the present disclosure. Expected performance estimation 400C depicts a narrower band of pairings (i.e., shorter acceptable distance from the diagonal to include in the sample) than expected performance estimation 400B (FIG. 4B), and the excluded regions are larger. In expected performance estimation 400C, the subset of 12 historical assignments contained 8 pairings with desirable outcomes (the O's). Therefore, the estimated expected performance of the diagonal BP strategy may be determined to be 8/12≈67%, or an approximately 63% gain over the underlying strategy for this amount of (less limited) choice, which tends to yield pairings distributed throughout this relatively narrow band.

In the example of FIGS. 4A-4C, the expected performance increased as the band for sampling narrowed, an indicator that this diagonal BP model may be effective for optimizing or otherwise increasing the performance of the task assignment system as compared to the underlying task assignment strategy (e.g., FIFO).

In some embodiments, arbitrarily many samples may be measured at varying distances from the diagonal, starting with the full set and ending with an infinitesimally small distance from the diagonal.

As the band narrows, approaching closer to an infinitesimally small band around the diagonal (representing peak performance with ideal, optimal choice for every pairing), more and more historical tasks are excluded as being pairings that the diagonal BP strategy would likely not have made (being too far from the preferred pairings closer to the diagonal). This effect is apparent in FIGS. 4A-4C: FIG. 4A included 29 historical assignments (the full set), FIG. 4B sampled 21 of the historical assignments, and FIG. 4C sampled only 12.

Figure 4D:
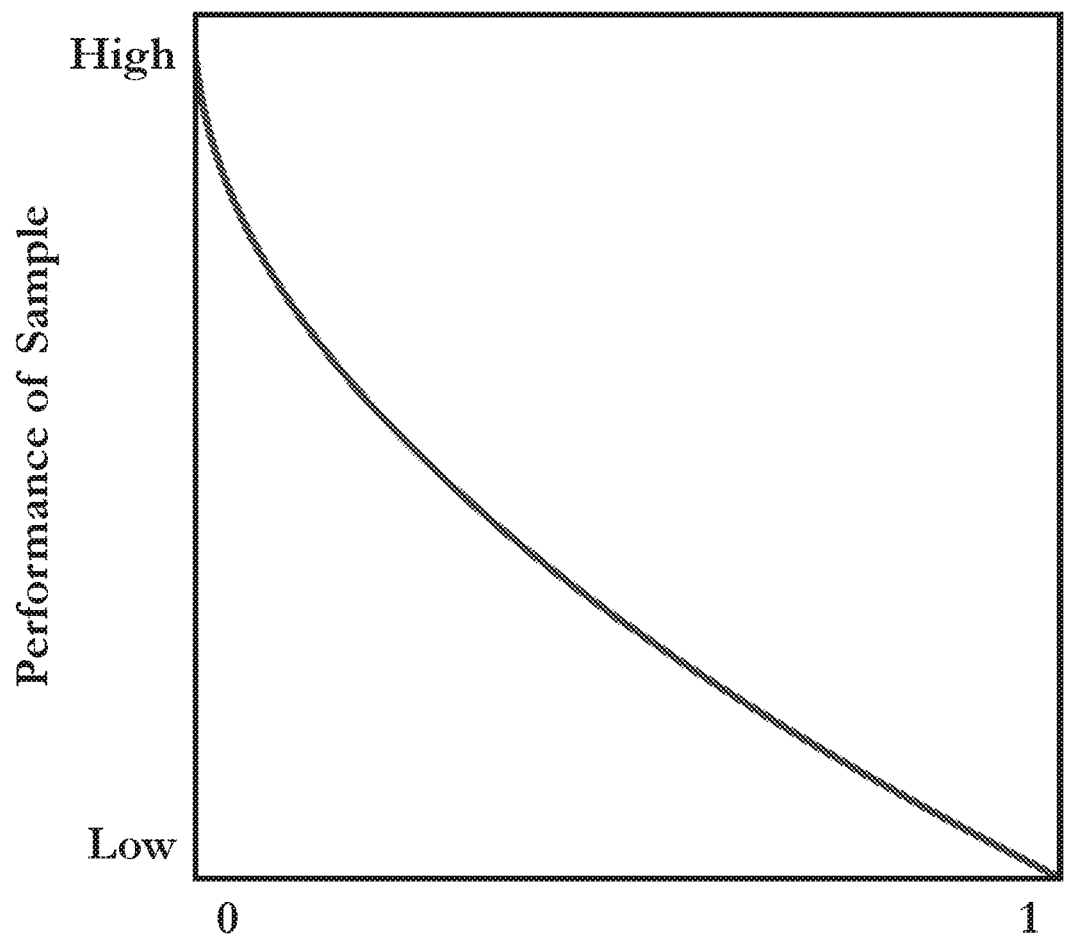
FIG. 4D shows a schematic representation of a task assignment strategy expected performance estimation according to embodiments of the present disclosure.
Figure 4E:
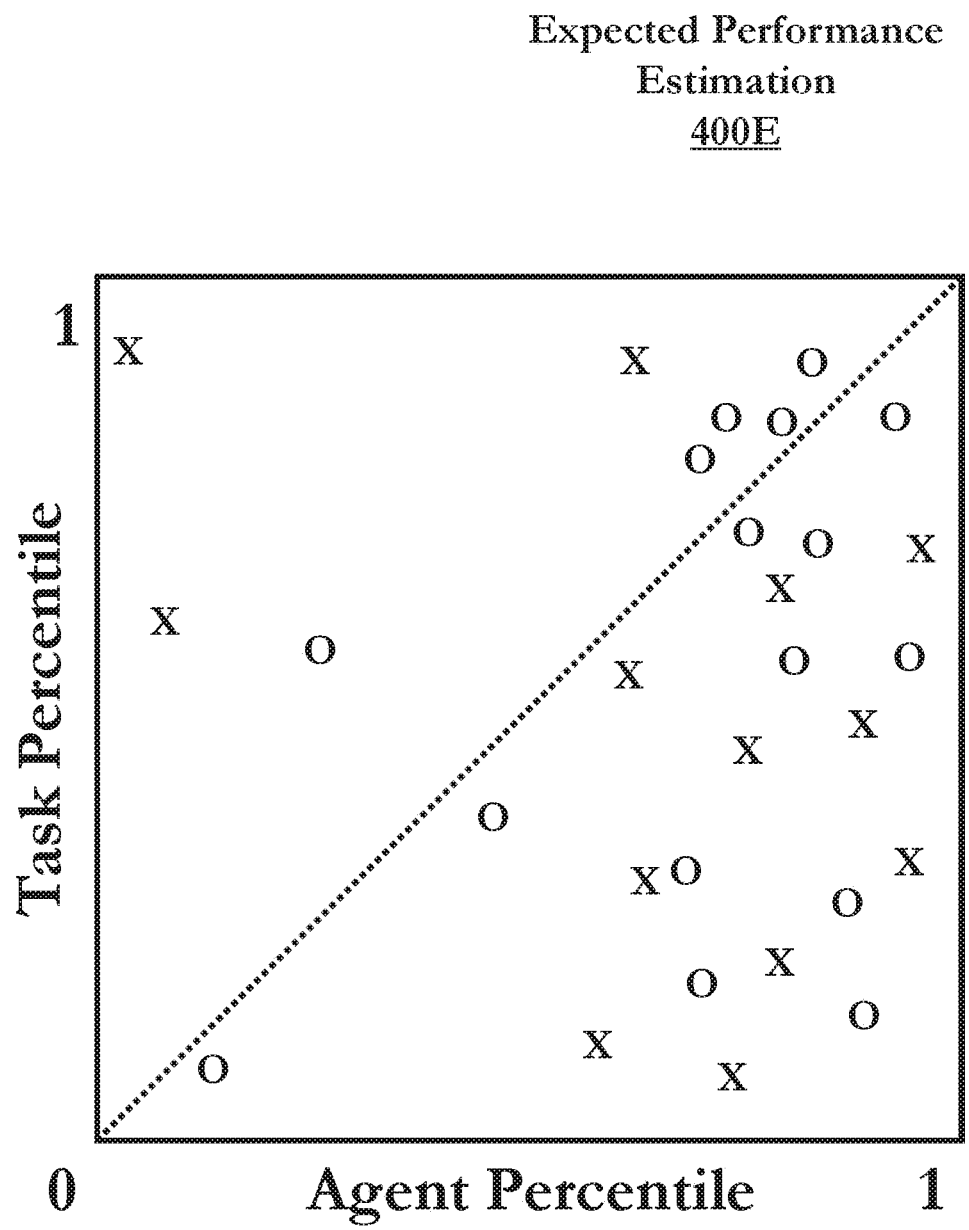
FIG. 4E shows a schematic representation of a task assignment strategy expected performance estimation according to embodiments of the present disclosure.
Figure 4F:
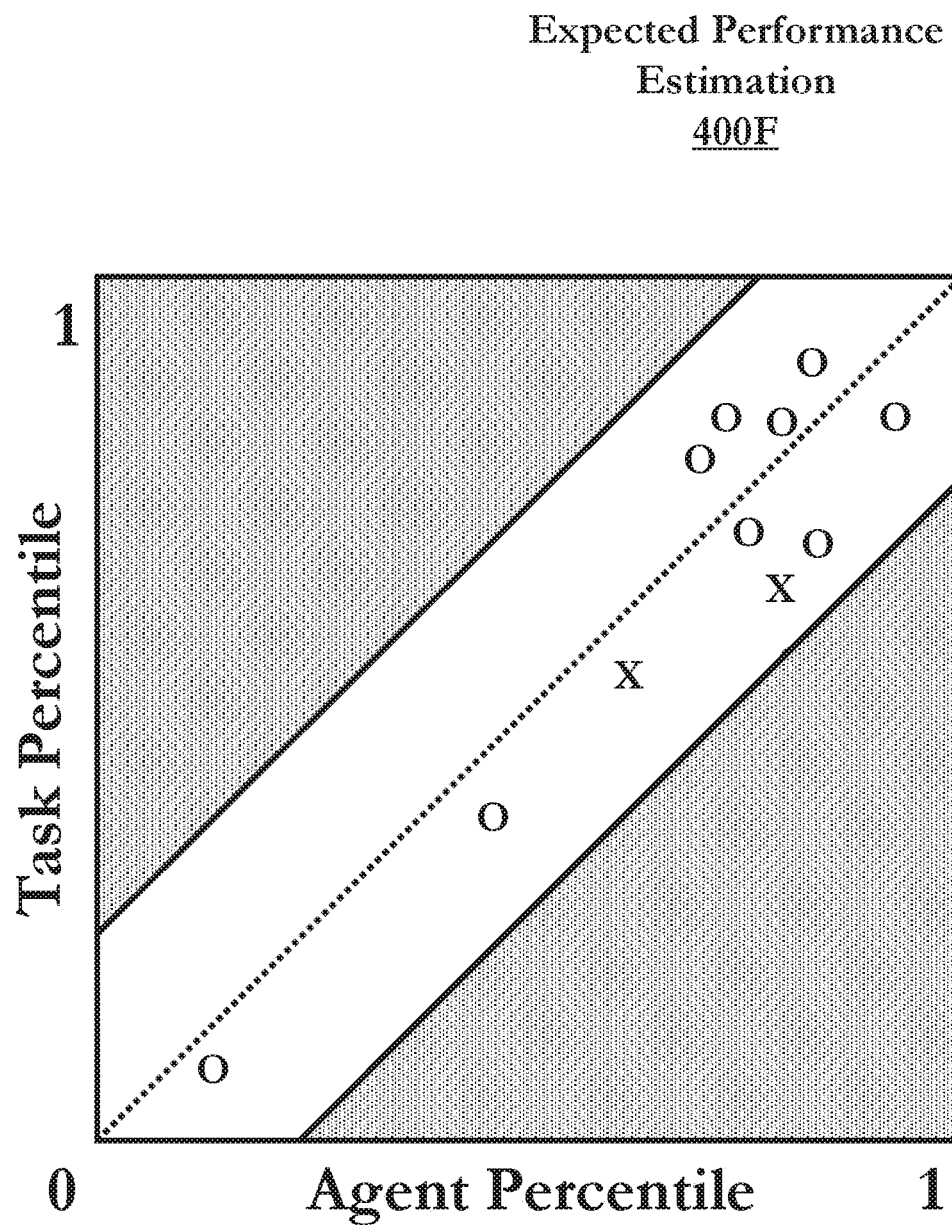
FIG. 4F shows a schematic representation of a task assignment strategy expected performance estimation according to embodiments of the present disclosure.
Figure 4G:
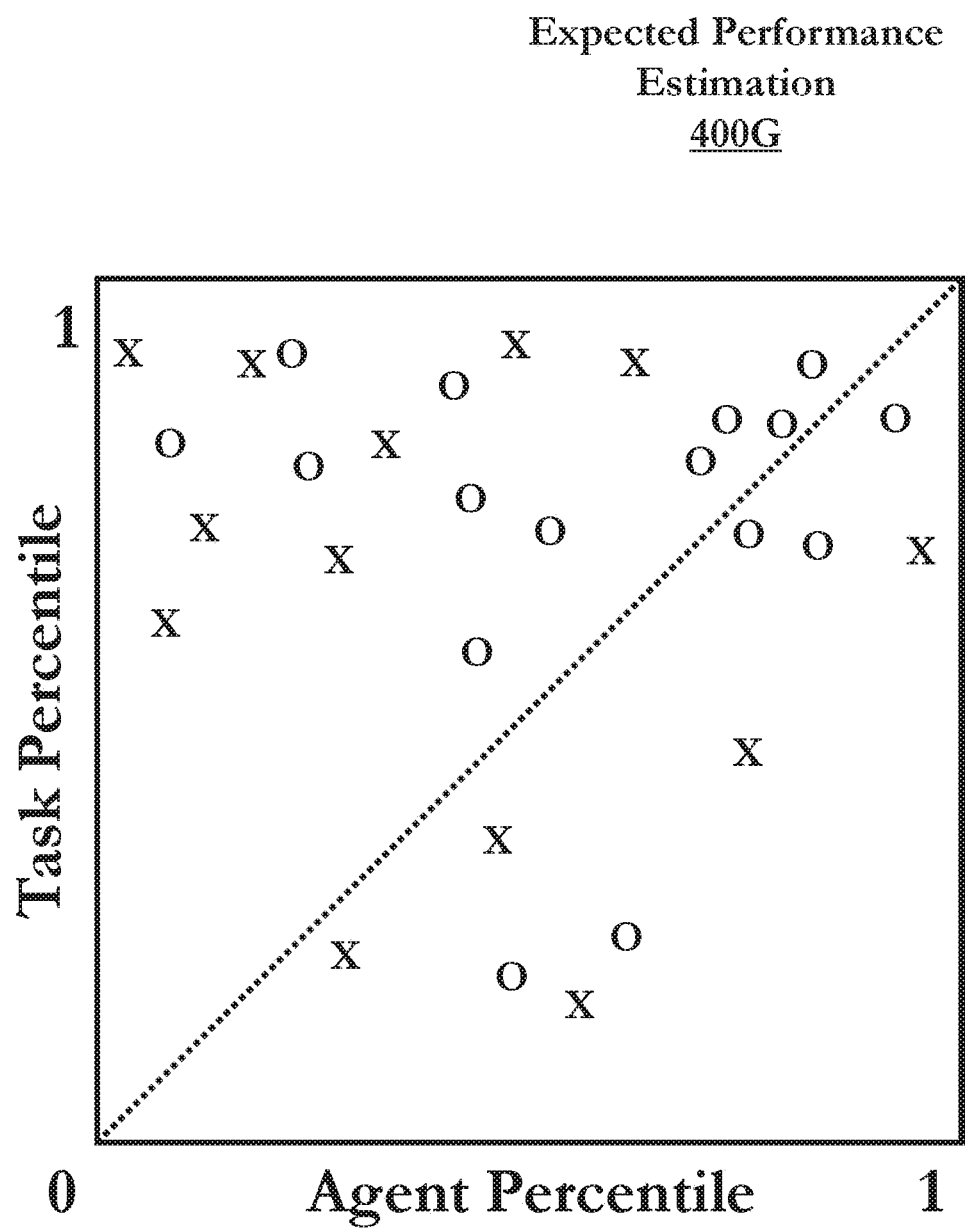
FIG. 4G shows a schematic representation of a task assignment strategy expected performance estimation according to embodiments of the present disclosure.
Figure 4H:
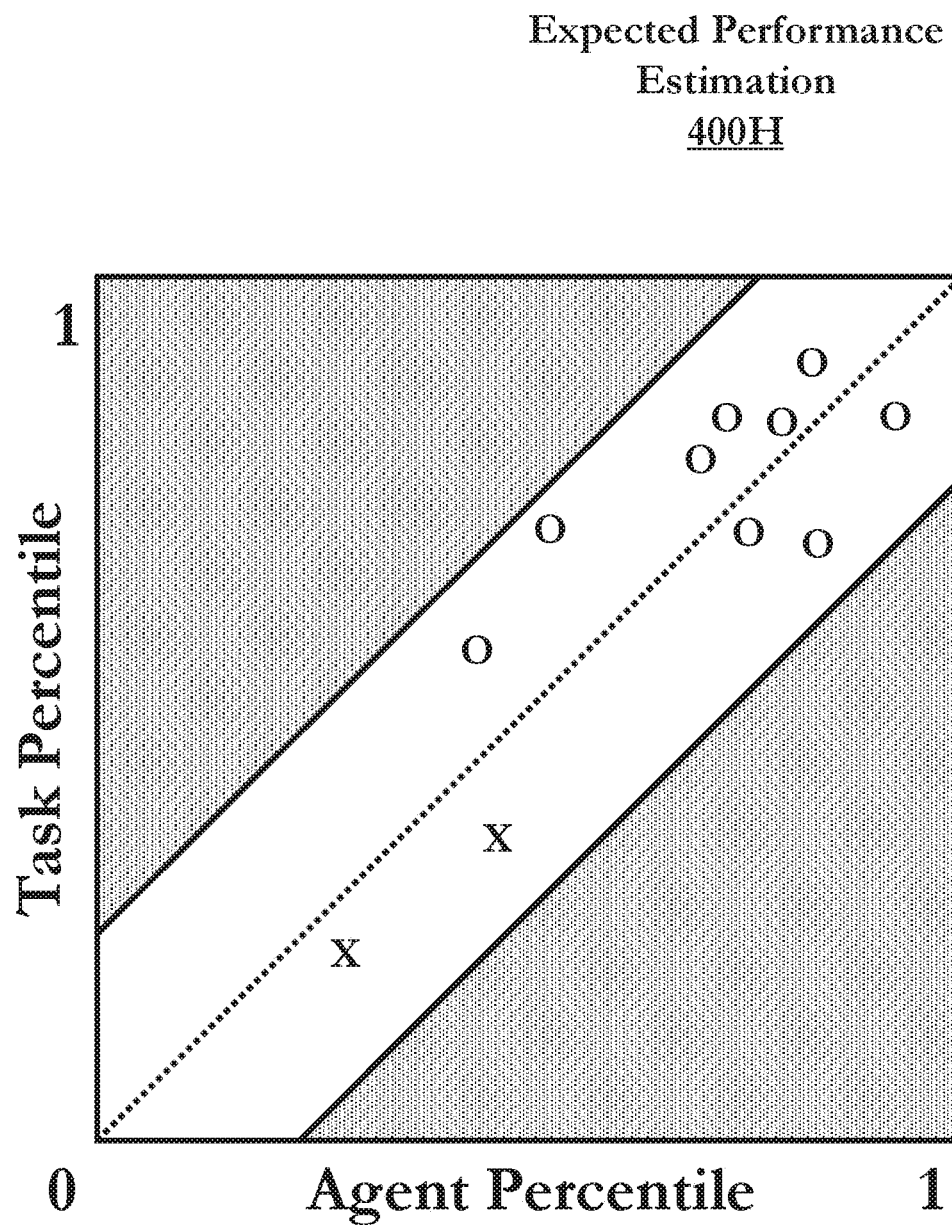
FIG. 4H shows a schematic representation of a task assignment strategy expected performance estimation according to embodiments of the present disclosure.
Figure 4I:
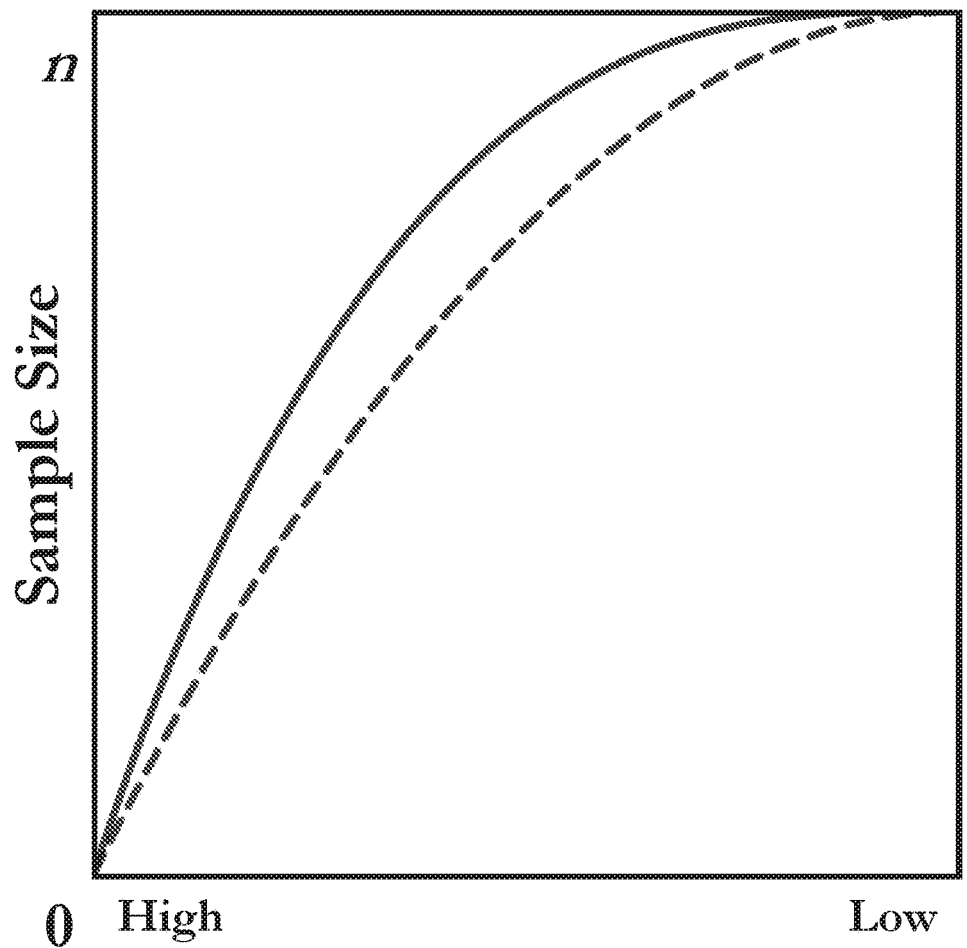
FIG. 4I shows a schematic representation of a task assignment strategy expected performance estimation according to embodiments of the present disclosure.
Figure 4J:
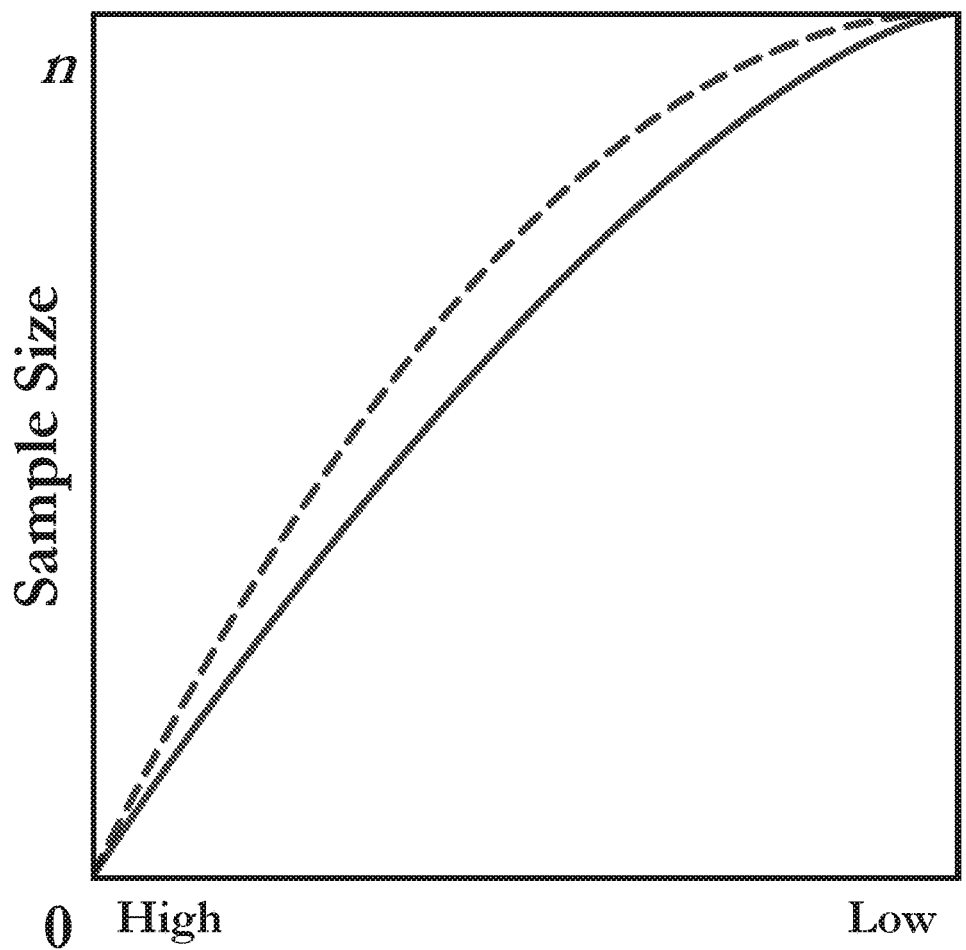
FIG. 4J shows a schematic representation of a task assignment strategy expected performance estimation according to embodiments of the present disclosure.

FIG. 4D shows a schematic representation of a task assignment strategy expected performance estimation 400D according to embodiments of the present disclosure. Expected performance estimation 400D shows a correlation curve when plotting out the expected performance (e.g., ratio of desirable outcomes to sample size) against varying degrees of threshold closeness of fit. The correlation curve starts near top left and drops off toward bottom right, indicating that a sample's performance increases as the threshold closeness of fit narrows toward the preferred task assignment strategy (e.g., pairing tasks with agents that fall close to the diagonal).

In a real-world task assignment system using a BP task assignment strategy, actual task assignments may be found throughout the pairing space, with many pairings relatively close to the optimal diagonal, and with other pairings relatively far from the optimal diagonal. The distribution of assignments at varying degrees of threshold closeness of fit can help estimate how well the BP task assignment strategy achieves peak performance. Comparing this distribution of real-world (e.g., BP "On" data) to the expected performance estimation 400D may allow for an increasingly accurate estimate of overall expected performance. In some embodiments, the expected performance may be a simple average of the performance of samples across varying degrees of closeness of fit. In other embodiments, the expected performance may be a weighted average of the performance of samples across varying degrees of closeness of fit and weighted according to the distribution of pairings found in collections of "On" data when the task assignment system was using a preferred pairing strategy (e.g., a BP strategy). In other embodiments, other formulae may be applied to estimate the expected performance or gain in the task assignment system using the correlation curve of expected performance estimation 400D.

As more and more historical tasks are excluded from increasingly narrow samples, the amount of data available to determine estimated gain decreases, so the accuracy of the estimation decreases as well. Indeed, at some sufficiently narrow band, all of the historical assignment data may be excluded, resulting in an empty sample with an undefined ("0/0") expected performance.

Consequently, it may be beneficial in some embodiments to compute the expected accuracy of the expected performance estimates (e.g., standard error) for each band tested. In these embodiments, the accuracy or error information would be available to help assess the reliability of a given expected performance estimation.

As above, in these embodiments, an arbitrarily large number of estimations and accuracy/error measurements may be made stepping through increasingly narrow bands, excluding more and more historical tasks as the band approaches closer and closer to optimal pairing until none remain.

The example shown in FIGS. 4A-4C used a single set of historical data. In some embodiments, this validation process can be repeated for arbitrarily many different sets of historical data. In some embodiments, each of the one or more historical assignment sets may be a "holdout set" or "validation set" that is wholly or at least partially different from the "training set" used to create the pairing strategy. In other embodiments, some or all of the historical assignment sets may be "in-samples" taken from a larger set of historical assignments used to create the pairing strategy.

In some embodiments, for either holdout sets or in-sample sets, these samples may be oversampled, counting a single historical assignment multiple times across multiple samples, for situations where such oversampling techniques are useful for determining more accurate expected performance estimations. For a simplistic example, if a holdout set contains five historical assignments labeled A-E, the first sample may contain historical assignments A, B, and C; the second sample may contain historical assignments B, C, and D; the third sample may contain historical assignments C, D, and E; and so on. In this example, historical assignment B is oversampled, included in at least the first and second samples. In another example, such as when oversampling for a narrowing threshold closeness of fit, the first (largest) sample may contain historical assignments A-E; the second (smaller) sample may contain historical assignments B-D; and so on, to the smallest sample that may contain only historical assignment B.

Embodiments of the present disclosure may use one or more of a variety of different validation techniques, such as k-fold, random, time, random time, random rolling, off data, train on/off, train off, lift curve, etc. In some embodiments, the validation techniques may also include normalization for time-based changes in the call center system environment. Generalized k-fold validation techniques and some of these other techniques are described in detail in, e.g., James et al., *An Introduction to Statistical Learning* (2013), at pp. 29-33 and 176-86, and Hastie et al., *The Elements of Statistical Learning*, 2d ed. (2008), at pp. 219-57, which are hereby incorporated by reference herein.

In the preceding example, the underlying task assignment strategy may have been FIFO, which resulted in historical assignments that were distributed relatively uniformly throughout the space of possible pairings. However, in some task assignment systems, a different task assignment strategy may have been used that introduces utilization bias to the agents and/or tasks. FIGS. 4E and 4F show an example of agent utilization bias due to PBR, and FIGS. 4G and 4H show an example of task utilization bias due to a task prioritization strategy (e.g., prioritized or "VIP" call routing in a call center).

FIG. 4E shows a schematic representation of a task assignment strategy expected performance estimation 400D according to embodiments of the present disclosure. In this example, most of the historical assignments are clustered toward the right side of the graph, around agents having higher percentile rankings. In this example, agent percentile is proportional to agent performance, and this agent utilization bias is due to having used PBR as the underlying pairing strategy for the historical assignments. In other embodiments or contact center environments, percentiles may correspond to metrics other than performance. For example, agent percentile may be proportional to each agent's ability to influence the outcome of a call regardless of the agent's overall performance (e.g., amount of revenue generated).

Consequently, there is proportionally less data available for agents at lower percentiles. Thus, if left uncorrected, this bias could also skew or bias expected performance estimations as explained below with reference to FIG. 4F.

FIG. 4F shows a schematic representation of a task assignment strategy expected performance estimation 400E according to embodiments of the present disclosure. Expected performance estimation 400E depicts the same historic assignments as expected performance estimation 400D, with the regions outside the band, farther from the diagonal, have been excluded.

The subset of included historic assignments also have a biased distribution, skewed toward higher-ranking agents. A naïve approach to estimating expected performance for this band would note that there are 9 desirable outcomes out of a total of 11 historic agent tasks. However, many of these desirable outcomes are clustered around higher-performing agents and so may lead to an unrealistically high expected performance estimation.

Therefore, in some embodiments, expected performance may be estimated more accurately by weighting each vertical slice of historic assignments proportionally according to the number of historic assignments found within a given slice. Reweighting the subset of historic assignments in this way (i.e., "Agent Percentile Correction" or "AP Correction") may remove the bias from the underlying PBR strategy, yielding a more accurate estimate of expected performance.

FIG. 4G shows a schematic representation of a task assignment strategy expected performance estimation 400F according to embodiments of the present disclosure. In this example, most of the historical assignments are clustered toward the top of the graph, around tasks having higher percentile rankings. In this example, this task utilization bias is due to having used a task prioritization strategy as the underlying pairing strategy for the historical assignments.

Consequently, there is proportionally less data available for tasks at lower percentiles. Thus, if left uncorrected, this bias could also skew or bias expected performance estimations as explained below with reference to FIG. 4H.

FIG. 4H shows a schematic representation of a task assignment strategy expected performance estimation 400G according to embodiments of the present disclosure. Expected performance estimation 400G depicts the same historic assignments as expected performance estimation 400F, with the regions outside the band, farther from the diagonal, have been excluded.

The subset of included historic assignments also have a biased distribution, skewed toward higher-ranking tasks. A naïve approach to estimating expected performance for this band would note that there are 9 desirable outcomes out of a total of 11 historic agent tasks. However, many of these desirable outcomes are clustered around higher-performing agents and so may lead to an unrealistically high expected performance estimation.

Therefore, in some embodiments, expected performance may be estimated more accurately by weighting each horizontal slice of historic assignments proportionally according to the number of historic assignments found within a given slice. Reweighting the subset of historic assignments in this way (i.e., "Task Percentile Correction" or "TP Correction", or for a contact center context, "Contact Percentile Correction" or "CP Correction") may remove the bias from the underlying task/contact prioritization strategy, yielding a more accurate estimate of expected performance.

In some embodiments, it may be useful to measure how well (or how poorly) the underlying task assignment strategy optimizes performance relative to the task assignment strategy under validation. FIGS. 4I and 4J depict an example of one such technique applied to a diagonal BP pairing strategies.

FIG. 4I shows a schematic representation of a task assignment strategy expected performance estimation 400H according to embodiments of the present disclosure. The x-axis is labeled "Realization of Peak Performance" and proceeds from "High" near the origin to "Low" on the right. For a diagonal BP model, high realization of peak performance indicates sampling historical assignments relatively close to the ideal, optimal diagonal line, at which hypothetical peak performance may be achieved. Low realization of peak performance indicates sampling historical assignments in a wider band spread out farther from the diagonal.

The y-axis is labeled "Sample Size" and proceeds from 0 near the origin to n (here, the size of the full set of n historical assignments) at the top. For a diagonal BP model, the sample size shrinks as the band size becomes increasingly narrow. As the band size approaches peak performance along the diagonal, the sample size eventually drops to 0. As the band size approaches low performance, the sample size eventually reaches n, encompassing the entire set of historical assignments.

If the underlying task assignment strategy had been FIFO, whereby the historical assignments may be relatively evenly distributed throughout each band, it may often be the case that sample size decreases proportionally to the square of the width of the band as the width decreases toward peak performance. As such, FIFO is a neutral strategy that represents a baseline performance level within the task assignment system. In expected performance estimation 400H, the dashed curve represents this baseline performance level for each sample size.

In this example, the solid curve "bows above" the dashed baseline performance curve, such that the sample size increases rapidly for relatively high realizations of peak performance (relatively narrow bands). In these environments, historical assignments may appear to be clustered proportionally closer to the diagonal. In these environments, the underlying strategy that generated the historical assignments may already be achieving a relatively high realization of peak performance when compared to the task assignment strategy being validated. Thus, the expected gain over the underlying (incumbent) strategy may be relatively low as compared to FIFO.

FIG. 4J shows a schematic representation of a task assignment strategy expected performance estimation 400I according to embodiments of the present disclosure. The expected performance estimation 400I is similar to the expected performance estimation 400H (FIG. 4I), expect in this example, the curve "bows below" the dashed baseline performance curve, such that the sample size increases slowly for relatively high realizations of peak performance (relatively narrow bands). In these environments, historical assignments may appear to be clustered in regions proportionally farther from the diagonal. In these environments, the underlying strategy that generated the historical assignments may be performing worse than FIFO, which may be mathematically equivalent to a strategy that performs worse than random. Thus, the expected gain over the underlying (incumbent) strategy may be relatively high as compared to FIFO.

In some embodiments, it may be useful to estimate or otherwise predict which band or range of bands most likely models the "real-world" task assignment system. In the real-world task assignment system, the task assignment system will experience varying degrees of possible choice over time as the supply of available agents to meet the demand of waiting tasks constantly fluctuates. The real-world distribution of choice likely peaks somewhere between ideal, optimal choice (peak performance) and completely constrained, limited choice (e.g., always one-to-one, or "L0").

Figure 4K:
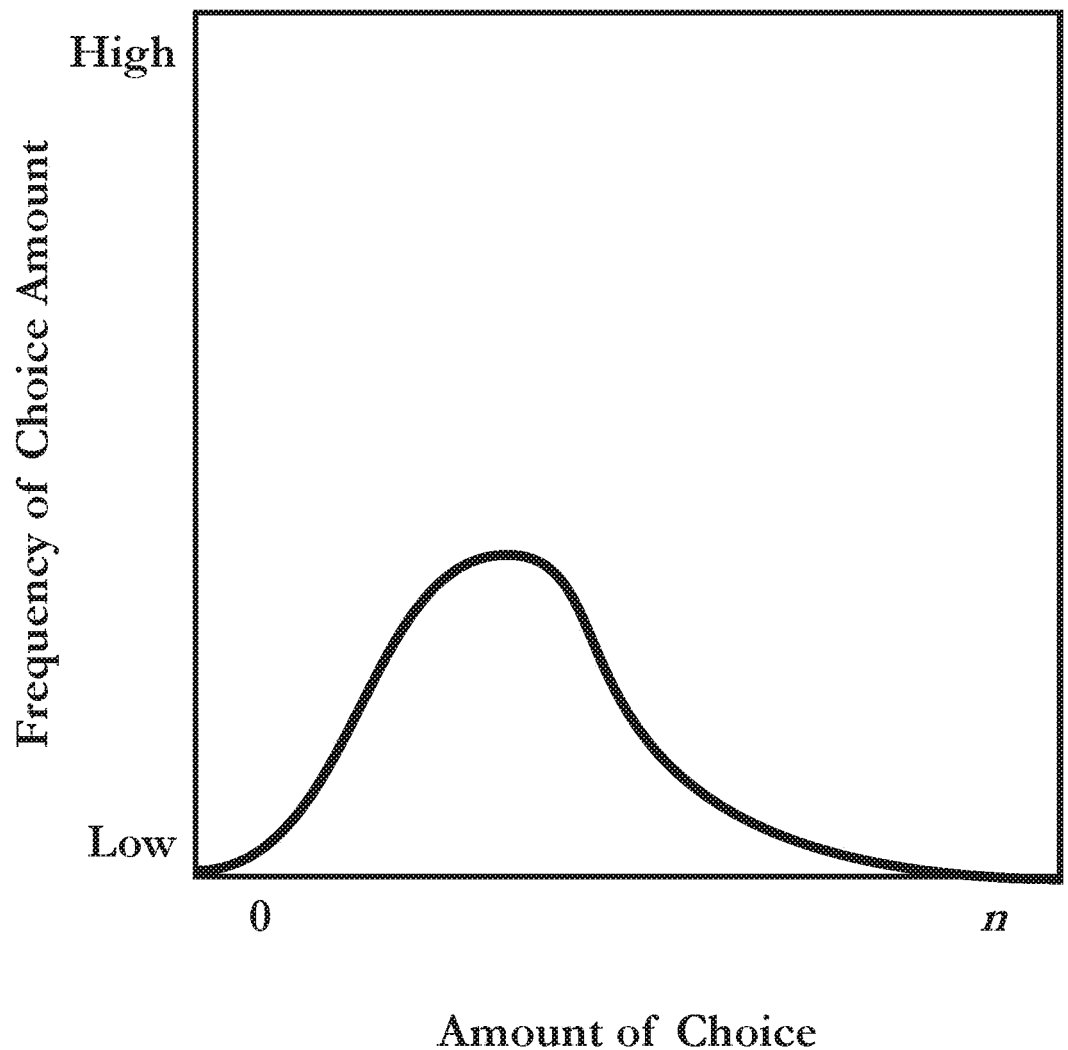
FIG. 4K shows a schematic representation of a task assignment strategy expected performance estimation according to embodiments of the present disclosure.

FIG. 4K illustrates a technique to visualize the distribution of freedom of choice found in the underlying historical assignment data to improve the real-world expectations of an estimated expected performance of the task assignment strategy being validated.

FIG. 4K shows a schematic representation of a task assignment strategy expected performance estimation 400J according to embodiments of the present disclosure. In these embodiments, information about the distribution or frequency of varying degrees of choice may be associated with the historical assignment information, and a band or range of bands may be determined to model the real-world task assignment system more closely than other bands/samples. Having identified this band or range of bands, these embodiments may output the estimated expected performance and/or standard error for the identified band or range of bands as being the most probable expected performance.

In some embodiments, a workforce recommendation may be made to increase or decrease agent staffing to increase the average amount of choice available to a pairing strategy for selecting agents or tasks, respectively. In some embodiments, a pairing strategy may delay pairings when the amount of choice available is considered too low, allowing time for more tasks and/or agents to become ready for pairing.

The preceding examples primarily discussed diagonal BP strategies. In some embodiments, an expected performance may be estimated for other types of BP strategies such as a network flow BP strategy.

FIG. 5 shows a schematic representation of a task assignment payout matrix 500 according to embodiments of the present disclosure. Similar to task assignment model 300A (FIG. 3A) and contact pairing model 300B (FIG. 3B), payout matrix 500 shows three agents $a_0$-$a_2$ and three task types $t_0$-$t_2$. Each cell contains the value of an interaction term $g(a_i, t_k)$ for a given agent and task type assignment.

In this example, three preferred pairings have an expected value of 1 and fall along the diagonal, and the other less-preferred pairings have an expected value of 0.5 or 0. Unlike the example of contact pairing model 300B (FIG. 3B), the expected values of pairings do not consistently decrease as the pairings get farther from the diagonal. For example, the pairing of task $t_1$ to agent $a_2$ (expected value of 0) is closer to the diagonal than the pairing of task $t_2$ to agent $a_2$ (expected value of 0.5).

In some embodiments, a diagonal pairing strategy may still provide outstanding performance improvements and balanced agent utilization even for environments such as the highly simplified illustrative example of task assignment payout matrix 500. In other embodiments, a different pairing strategy, such as a network flow (or linear programming)-based BP strategy may provide greater performance optimization while still achieving a desired balance of agent utilization, such as for environments analogous to task assignment payout matrix 500 for which no ordering of agents and tasks provide a consistent increase in expected values as pairings' distance to the diagonal gets shorter (i.e., the closeness of fit gets closer). The task assignment payout matrix 500 may be used in conjunction with a network flow BP strategy as described in, e.g., U.S. patent application Ser. No. 15/582,223, which was previously incorporated by reference herein.

As with a diagonal BP strategy, a network flow BP strategy may also be validated using historical assignment data. However, because there is no geometric analogy for a network flow BP strategy like distance from the diagonal line in a diagonal BP strategy, these validation techniques are not readily illustrated in figures as they were in FIGS. 4A-4H. In some embodiments, the historical assignments may be sampled (or oversampled) repeatedly at one or more approximations to the network flow BP strategy's peak performance given ideal or optimal amount of choice. For example, historical assignment samples size 3 (or 4 or more) may be determined.

For example, a sample of historical assignments may include a preferred pairing of $a_0$ to $t_2$ with a desirable outcome, a non-preferred pairing of $a_1$ to $t_1$ with a desirable outcome, and a non-preferred pairing of $a_2$ to $t_0$ with an undesirable outcome. The underlying performance of this sample may be determined as the proportion of desirable outcomes in the sample, or 2/3≈67%.

Given a choice of three as in sample size three, non-preferred pairings according to network flow 500B may be excluded. Consequently, only one historical assignment, $a_1$ to $t_1$ with a desirable outcome, is in the sample, or 1/1=100%.

In these embodiments, the amount of data available in any one sample is highly constrained (e.g., only 3 historical assignments) in contrast with dozens or many thousands of historical assignments that may be find in the full set. Thus, it may be especially important to repeatedly sample the historical assignments to determine frequencies of preferred pairings and the weighted proportions of those that had desirable outcomes.

As with the diagonal BP strategy, it may be useful to determine whether the underlying strategy is already partially optimized and/or to correct for overrepresentation or bias of agents and/or tasks in the historical assignment data.

Although the techniques vary in the details depending on the type of task assignment strategy being created and validated (e.g., diagonal BP strategy validation techniques compared with network flow BP strategy validation techniques), these techniques may involve sampling or weighting historical assignment data. In some embodiments, these techniques may involve repeated sampling, oversampling, bias correction, approximation toward peak performance or optimal choice, expected performance estimation, expected gain estimation (comparisons to underlying historical performance), accuracy/error measurements, expected real-world gain estimation (e.g., comparisons to underlying distribution of available choice), etc. FIGS. 6A-9 depict flow diagrams for various expected performance estimation methods described above.

Figure 6A:
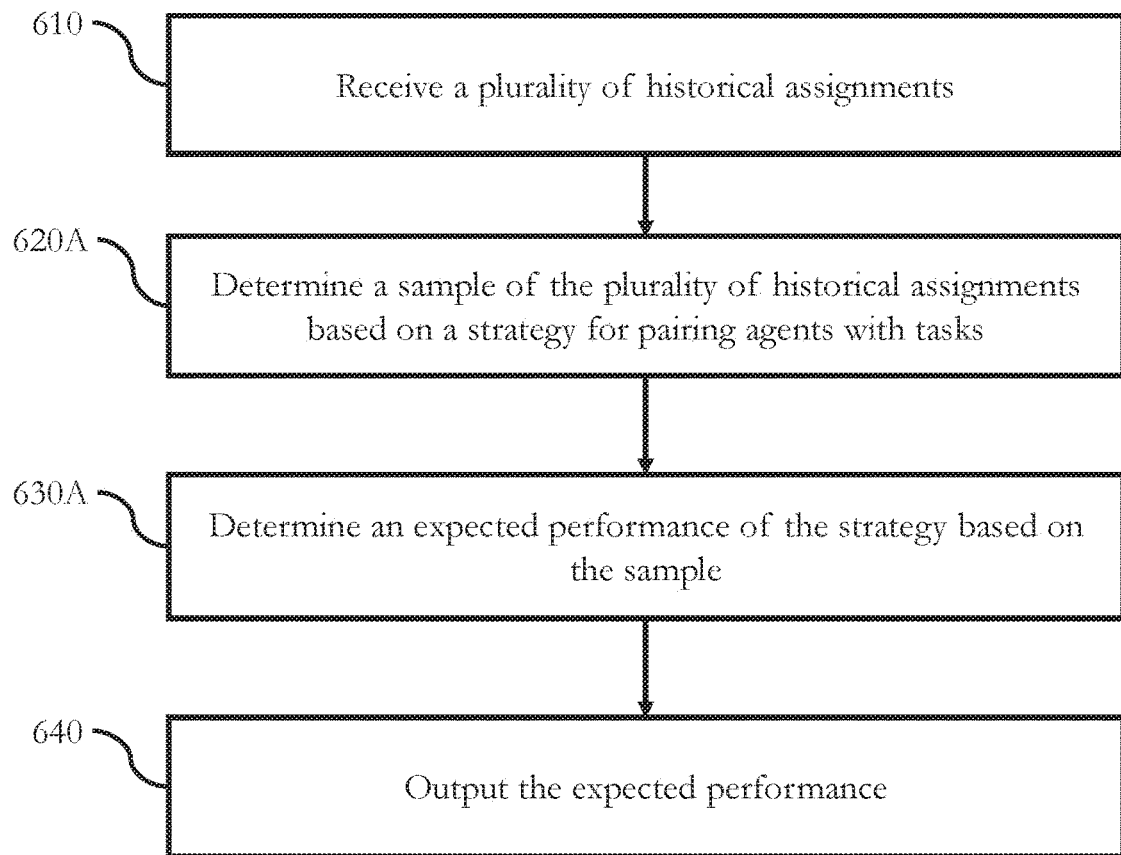
FIG. 6A shows a flow diagram of an expected performance estimation method according to embodiments of the present disclosure.

FIG. 6A shows a flow diagram of an expected performance estimation method 600A according to embodiments of the present disclosure. At block 610, expected performance estimation method 600A may begin.

At block 610, a plurality of historical assignments may be received. In some embodiments, the plurality of historical assignments may be received from a historical assignment module such as historical assignment module 150 (FIG. 1) or a historical contact pairing module 250 (FIG. 2). In some embodiments, the plurality of historical assignments may be an in-sample of the plurality of historical assignments that were also used to build, generate, construct, train, refine, or otherwise determine a task assignment (pairing) model or task assignment (pairing) strategy. In other embodiments, the plurality of historical assignments be an out-sample (holdout set, validation set, etc.) that include historical assignments that were not used for model building. After receiving the plurality of historical assignments, the expected performance estimation method 600A may proceed to block 620A.

At block 620A, a sample of the plurality of historical assignments based on a strategy for pairing agents with tasks may be determined. In some embodiments, the sample may be determined by an expected performance estimation module such as expected performance estimation module 160 (FIGS. 1 and 2). In some embodiments, the sample may be determined by analyzing the plurality of historical assignments, including historical assignments in the sample that are sufficiently likely to have occurred using the task assignment strategy and excluding historical assignments from the sample that are sufficiently unlikely to have occurred. For example, in the case of a diagonal BP strategy, including pairings that fall within a band or specified distance from the diagonal line. After determining the sample of the plurality of historical assignments based on the pairing strategy, expected performance estimation method 600A may proceed to block 630A.

At block 630A, an expected performance of the pairing strategy based on the sample may be determined. In some embodiments, the determination or estimation of expected performance may be computed as the proportion of desirable outcomes (e.g., positive outcomes for binomial variables, or sufficiently positive outcomes for multinomial or continuous variables) to the total number of historical pairings in the sample. In other embodiments, the expected performance estimation may be corrected or otherwise adjusted to account for bias that may exist in the underlying historical assignment data, such as overrepresentation of a subset of agents (e.g., under PBR) or overrepresentation of a subset of task types (e.g., under a task prioritization strategy). In some embodiments, the expected performance estimation may account for the frequencies at which some of the historical assignments may have been oversampled (e.g., counted multiple times within the same sample in accordance with a sample determination technique). After determining the expected performance of the pairing strategy, expected performance estimation method 600A may proceed to block 640.

At block 640, the determined or estimated expected performance may be outputted. In some embodiments, expected performance estimation module 160 may out the estimated expected performance to the task assignment module 110 (FIG. 1), the switch 210 (FIG. 2), or another component or module within a task assignment system or otherwise communicatively coupled to the task assignment system.

In some embodiments, after outputting the estimated expected performance determined at block 630, the expected performance estimation method 600A may return to block 620 to determine a different sample. In other embodiments, the expected performance estimation method 600A may return to block 610 to receive a different plurality of historical assignments (e.g., a different in-sample or a different holdout set). In other embodiments, the expected performance estimation method 600A may end.

Figure 6B:
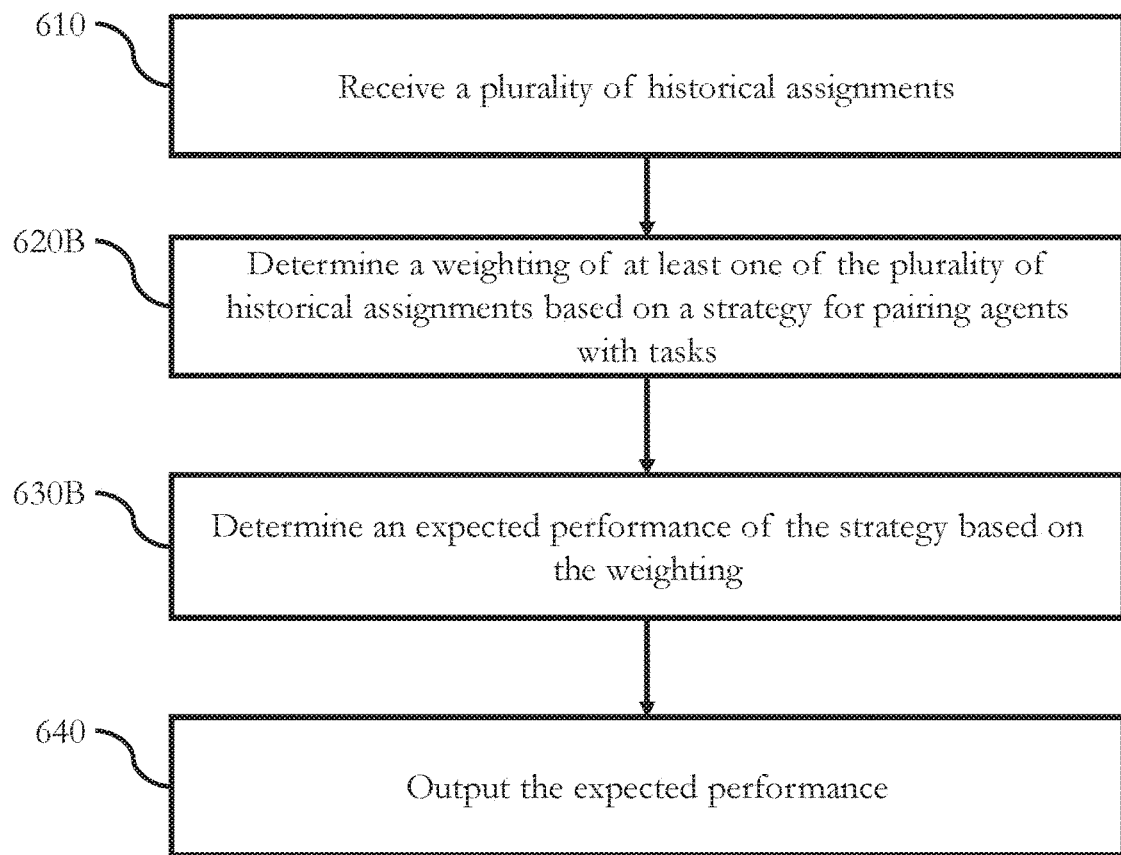
FIG. 6B shows a flow diagram of an expected performance estimation method according to embodiments of the present disclosure.

FIG. 6B shows a flow diagram of an expected performance estimation method 600B according to embodiments of the present disclosure. The expected performance estimation method 600B is similar to the expected performance estimation method 600A except that historical assignments may be weighted instead of being included or excluded in a sample.

The expected performance estimation method 600B may begin at block 610. At block 610, a plurality of historical assignments may be received as in expected performance estimation method 600A. After receiving the plurality of historical assignments, the expected performance estimation method 600B may proceed to block 620B.

At block 620B, a weighting of at least one of the plurality of historical assignments based on a strategy for paring agents with tasks may be determined. In some embodiments, a weighting may be assigned to all of the historical assignments received at block 610. In some embodiments, a weighting of zero may be assigned to some of the historical assignments. In these embodiments, a zero-weight may be similar to excluding the historical pairing from a sample as in block 620A (FIG. 6A) of the expected performance estimation method 600A. In some embodiments, a weighting may indicate a likelihood that the historical assignment would have occurred under the pairing strategy being validated. After determining a weighting of at least one of the plurality of historical assignments, the expected performance estimation method 600B may proceed to block 630B.

At block 630B, an expected performance of the strategy based on the weighting may be determined. For example, the expected performance may be computed as a weighted average of the value associated with each of the weighted historical assignments. As in block 630A of the expected performance estimation method 600A, the expected performance estimation may be adjusted in various embodiments and situations, such as to correct for bias in the underlying historical assignment data. After determining the expected performance, the expected performance estimation method 600B may proceed to block 640.

At block 640, the expected performance may be outputted as in the expected performance estimation method 600A. In various embodiments, the expected performance estimation method 600B may return to block 610 for a next plurality of historical assignments, 620B for a next weighting determination, or the expected performance estimation method 600B may end.

Figure 7:
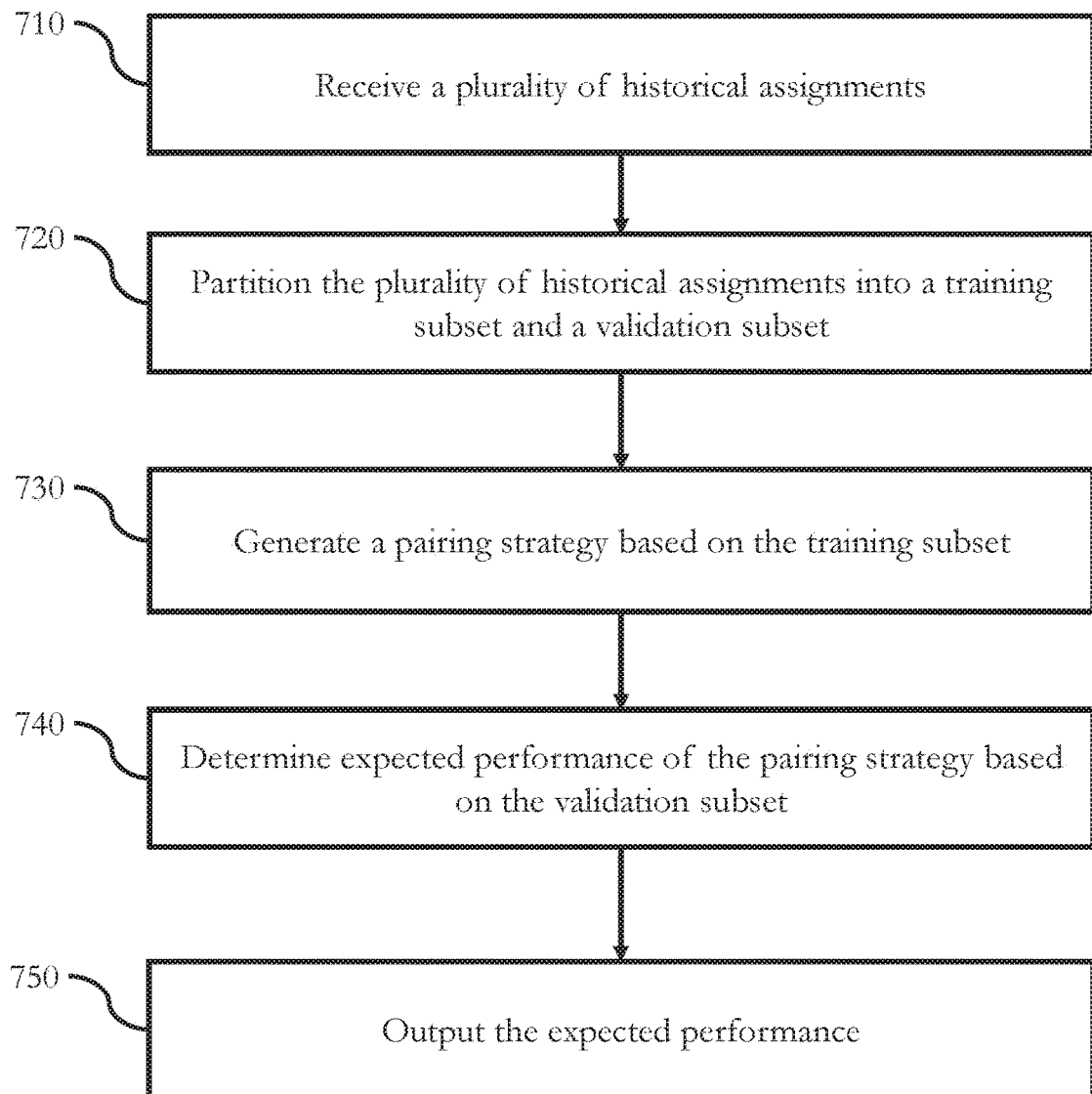
FIG. 7 depicts a flow diagram of an expected performance estimation method according to embodiments of the present disclosure.

FIG. 7 depicts a flow diagram of an expected performance estimation method 700 according to embodiments of the present disclosure. The expected performance estimation method 700 may begin at block 710.

At block 710, a plurality of historical assignments may be received. After receiving the plurality of historical assignments, the expected performance estimation method 700 may proceed to block 720.

At block 720, the plurality of historical assignments may be partitioned into a training subset and a validation subset (holdout subset, out-sample). After partitioning the plurality of historical assignments, the expected performance estimation method 700 may proceed to block 730.

At block 730, a pairing strategy may be generated based on the training subset. For example, the historical assignments may be used to identify patterns automatically within the task assignment system, and/or the historical assignments may be used to compute values/costs for a pairing model or payout matrix. After generating the pairing strategy, the expected performance estimation method 700 may proceed to block 740.

At block 740, expected performance of the pairing strategy may be determined based on the validation subset. In some embodiments, the expected performance may be determined using any of the validation techniques described herein such as expected performance estimation methods 600A and 600B (e.g., determining a sample or weightings of the validation set, respectively; determining expected performance based on the sample or weightings, respectively; and, in some embodiments, repeatedly sampling or weighting the historical assignment data). After determining the expected performance of the pairing strategy, the expected performance estimation method 700 may proceed to block 750.

At block 750, the expected performance may be outputted. After outputting the expected performance, some embodiments may return to block 720 to obtain a next validation set or to block 740 to determine a next expected performance based on the validation subset. In other embodiments, the expected performance estimation method 700 may end.

Figure 8:
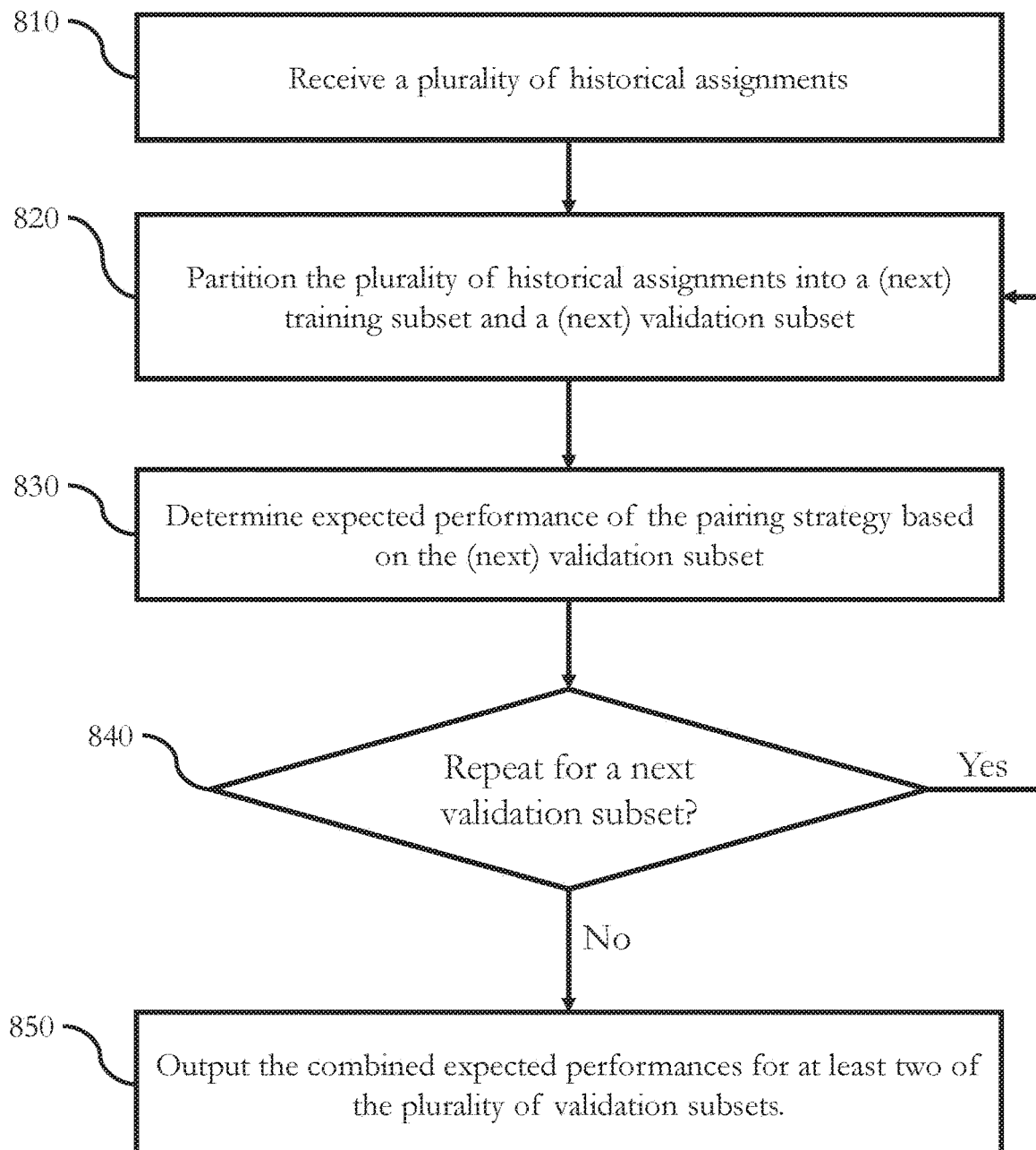
FIG. 8 depicts a flow diagram of an expected performance estimation method according to embodiments of the present disclosure.

FIG. 8 depicts a flow diagram of an expected performance estimation method 800 according to embodiments of the present disclosure. The expected performance estimation method 800 is similar to expected performance estimation method 700 (FIG. 7), except that it explicitly describes embodiments that may repeat some of the blocks for multiple validation sets. At block 810, the expected performance estimation method 800 may begin.

At block 810, a plurality of historical assignments may be received. After receiving the plurality of historical assignments, the expected performance estimation method 800 may proceed to block 820. At block 820, the plurality of historical assignments may be partitioned into a training subset and a validation subset. After partitioning the plurality of historical assignments, the expected performance estimation method 800 may proceed to block 830. At block 830, expected performance of the pairing strategy may be determined based on the validation set. After determining the expected performance, the expected performance estimation method 800 may proceed to block 840.

At block 840, a determination may be made as to whether to repeat part of the method for a next validation subset. If yes, the expected performance estimation method 800 may return to, for example, block 820 to partition a next validation subset and/or a next training subset, and to block 830 to determine expected performance based on the next validation subset. If no, the expected performance estimation method 800 may proceed to block 850.

At block 850, the combined expected performances (e.g., an average expected performance or a weighted average expected performance) for at least two of the plurality of validation subsets may be outputted. After outputting the combined expected performances, the expected performance estimation method 800 may end.

Figure 9:
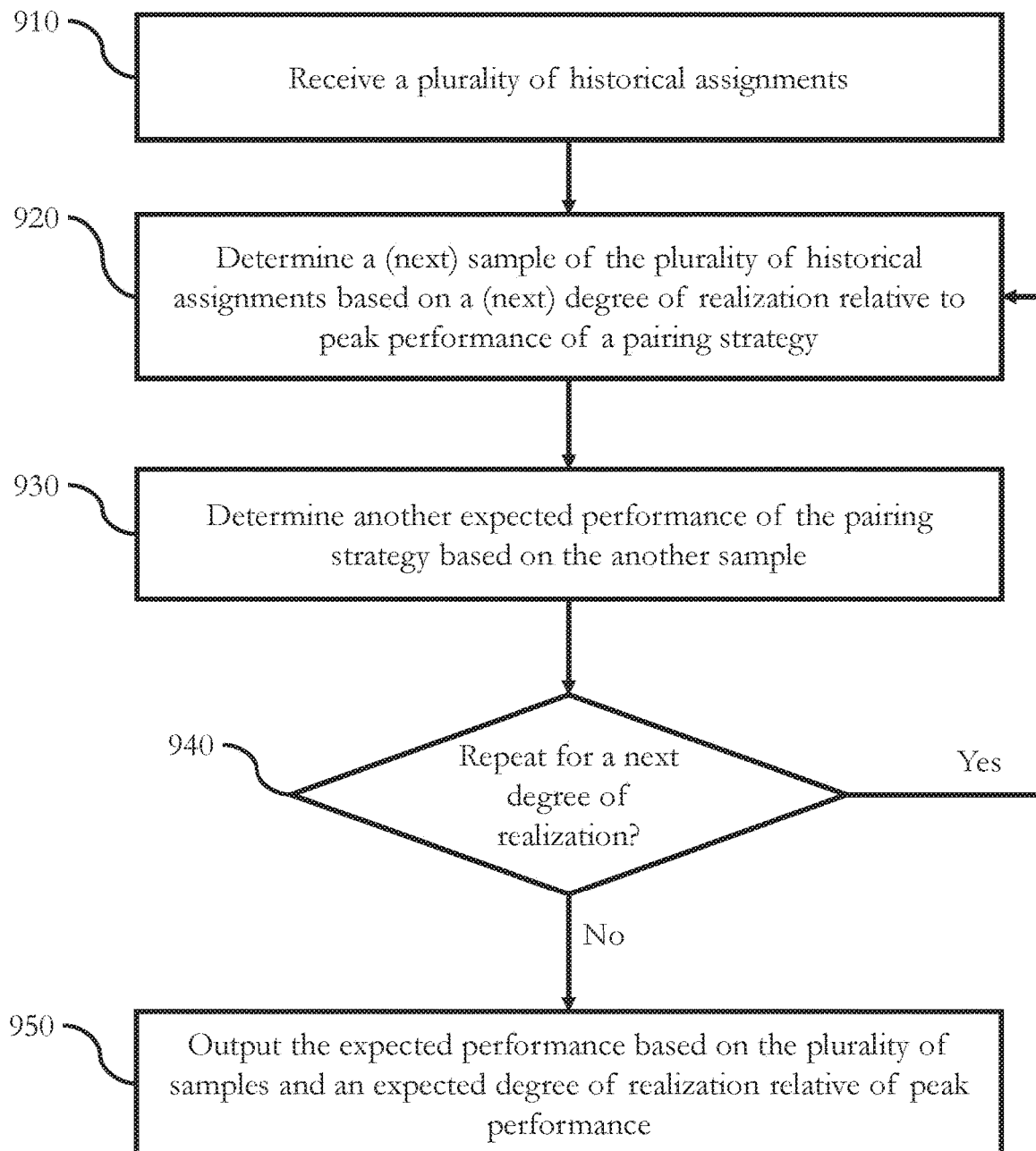
FIG. 9 depicts a flow diagram of an expected performance estimation method according to embodiments of the present disclosure.

FIG. 9 depicts a flow diagram of an expected performance estimation method 900 according to embodiments of the present disclosure. The expected performance estimation method 900 is similar to the process described with reference to FIGS. 4A-4H and 6A-6B, in which samples are repeatedly determined for estimating expected performance at increasing approximations of an ideal, peak strategy (e.g., progressively narrow bands for a diagonal BP strategy or progressively increasing sample sizes for a network flow BP strategy. At block 910, the expected performance estimation method 900 may begin.

At block 910, a plurality of historical assignments may be received. After receiving the plurality of historical assignments, the expected performance estimation method 900 may proceed to block 920.

At block 920, a sample of the plurality of historical assignments may be determined based on a degree of realization relative to peak performance of a pairing strategy (e.g., a particular band size or distance from the diagonal for a diagonal BP strategy or a particular sample size for a network flow BP strategy). After determining a sample, the expected performance estimation method 900 may proceed to block 930.

At block 930, an expected performance of the pairing strategy may be determined based on the sample, using any of the previously described techniques. After determining the expected performance, the expected performance estimation method 900 may proceed to block 940.

At block 940, a decision may be made whether to repeat for a next degree of realization. If yes, the expected performance estimation method 900 may return to block 920 to determine a next sample based on a next degree of realization (e.g., a narrower band in a diagonal BP strategy, or a larger sample size in a network flow BP strategy), and proceed to block 930 to determine another expected performance based on this next sample and next degree of realization. If no, the expected performance estimation method 900 may proceed to block 950.

At block 950, the expected performance based on the plurality of samples and an expected degree of realization relative of peak performance may be outputted. For example, a chart may be provided plotting the estimated expected performance along the y-axis for each degree of realization on the x-axis. In other embodiments, the expected performance estimates may be combined (e.g., an average or weighted average). In other embodiments, a determination of "real-world" realization of peak performance may be estimated, and the expected performance at the real-world degree of realization may be outputted. After outputting the expected performance, the expected performance estimation method 900 may end.

At this point it should be noted that estimating expected performance in a task assignment system in accordance with the present disclosure as described above may involve the processing of input data and the generation of output data to some extent. This input data processing and output data generation may be implemented in hardware or software. For example, specific electronic components may be employed in an expected performance estimation module or similar or related circuitry for implementing the functions associated with estimating expected performance in a task assignment system in accordance with the present disclosure as described above. Alternatively, one or more processors operating in accordance with instructions may implement the functions associated with estimating expected performance in a task assignment system in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method comprising:
receiving, by at least one computer processor communicatively coupled to and configured to perform contact-agent pairing operations in a contact center system, a plurality of contact types;
receiving, by the at least one computer processor, a plurality of agent sets;
receiving, by the at least one computer processor, a first plurality of contact-agent interaction sets and associated outcomes;
generating, by the at least one computer processor, a plurality of weights based on the first plurality of contactagent interaction sets, the plurality of contact types, and the plurality of agent sets;
receiving, by the at least one computer processor, a second plurality of contact-agent interaction sets and associated outcomes;
applying, by the at least one computer processor, the plurality of weights to the second plurality of contact-agent interaction sets; and
estimating, by the at least one computer processor, a performance of a pairing strategy based on the applying, wherein the pairing strategy is configured to cause a connection to be established between a contact and an agent in a switch of the contact center system.

2. The method of claim 1, wherein the plurality of weights consists of 0 and 1.

3. The method of claim 1, wherein the pairing strategy is a behavioral pairing strategy.

4. The method of claim 3, wherein the behavioral pairing strategy is a diagonal pairing strategy.

5. The method of claim 1, wherein the first and second pluralities of contact-agent interaction sets are not identical.

6. The method of claim 1, wherein the plurality of weights is based on a target utilization of at least one agent set of the plurality of agent sets.

7. The method of claim 1, wherein each of the plurality of weights represents a closeness of fit to the pairing strategy.

8. The system of claim 1, wherein the plurality of weights consists of 0 and 1.

9. The system of claim 1, wherein the pairing strategy is a behavioral pairing strategy.

10. The system of claim 9, wherein the behavioral pairing strategy is a diagonal pairing strategy.

11. The system of claim 1, wherein the first and second pluralities of contact-agent interaction sets are not identical.

12. The system of claim 1, wherein the plurality of weights is based on a target utilization of at least one agent set of the plurality of agent sets.

13. The system of claim 1, wherein each of the plurality of weights represents a closeness of fit to the pairing strategy.

14. A system comprising:
at least one computer processor communicatively coupled to and configured to perform contact-agent pairing operations in a contact center system, wherein the at least one computer processor is further configured to:
receive a plurality of contact types;
receive a plurality of agent sets;
receive a first plurality of contact-agent interaction sets and associated outcomes;
generate a plurality of weights based on the first plurality of contact-agent interaction sets, the plurality of contact types, and the plurality of agent sets;
receive a second plurality of contact-agent interaction sets and associated outcomes;
apply the plurality of weights to the second plurality of contact-agent interaction sets; and
estimate a performance of a pairing strategy based on the applying, wherein the pairing strategy is configured to cause a connection to be established between a contact and an agent in a switch of the contact center system.

15. An article of manufacture comprising:
a non-transitory computer processor readable medium; and
instructions stored on the medium;
wherein the instructions are configured to be readable from the medium by at least one computer processor communicatively coupled to and configured to perform contact-agent pairing operations in a contact center system and thereby cause the at least one computer processor to operate so as to:
receive a plurality of contact types;
receive a plurality of agent sets;
receive a first plurality of contact-agent interaction sets and associated outcomes;
generate a plurality of weights based on the first plurality of contact-agent interaction sets, the plurality of contact types, and the plurality of agent sets;
receive a second plurality of contact-agent interaction sets and associated outcomes;
apply the plurality of weights to the second plurality of contact-agent interaction sets; and
estimate a performance of a pairing strategy based on the applying, wherein the pairing strategy is configured to cause a connection to be established between a contact and an agent in a switch of the contact center system.

16. The article of manufacture of claim 15, wherein the plurality of weights consists of 0 and 1.

17. The article of manufacture of claim 15, wherein the pairing strategy is a behavioral pairing strategy.

18. The article of manufacture of claim 17, wherein the behavioral pairing strategy is a diagonal pairing strategy.

19. The article of manufacture of claim 15, wherein the first and second pluralities of contact-agent interaction sets are not identical.

20. The article of manufacture of claim 15, wherein the plurality of weights is based on a target utilization of at least one agent set of the plurality of agent sets.

21. The article of manufacture of claim 15, wherein each of the plurality of weights represents a closeness of fit to the pairing strategy.

* * * * *

UNITED STATES PATENT AND TRADEMARK OFFICE
CERTIFICATE OF CORRECTION

PATENT NO. : 10,999,439 B2
APPLICATION NO. : 16/930624
DATED : May 4, 2021
INVENTOR(S) : Zia Chishti et al.

It is certified that error appears in the above-identified patent and that said Letters Patent is hereby corrected as shown below:

In the Claims

At Column 23, Line number 49, Claim number 8; replace the entire claim with the following:
8. A system comprising:
  at least one computer processor communicatively coupled to and configured to perform contact-agent pairing operations in a contact center system, wherein the at least one computer processor is further configured to:
    receive a plurality of contact types;
    receive a plurality of agent sets;
    receive a first plurality of contact–agent interaction sets and associated outcomes;
    generate a plurality of weights based on the first plurality of contact–agent interaction sets, the plurality of contact types, and the plurality of agent sets;
    receive a second plurality of contact–agent interaction sets and associated outcomes;
    apply the plurality of weights to the second plurality of contact–agent interaction sets; and
    estimate a performance of a pairing strategy based on the applying, wherein the pairing strategy is configured to cause a connection to be established between a contact and an agent in a switch of the contact center system.

At Column 23, Line number 51, Claim number 9; edit the claim as follows:
9. The system of claim 8, wherein the plurality of weights consists of 0 and 1.

At Column 23, Line number 53, Claim number 10; edit the claim as follows:
10. The system of claim 8, wherein the pairing strategy is a behavioral pairing strategy.

At Column 23, Line number 55, Claim number 11; edit the claim as follows:
11. The system of claim 8, wherein the behavioral pairing strategy is a diagonal pairing strategy.

At Column 23, Line number 57, Claim number 12; edit the claim as follows:
12. The system of claim 8, wherein the first and second pluralities of contact–agent interaction sets Signed and Sealed this
Thirteenth Day of February, 2024

*Katherine Kelly Vidal*
Katherine Kelly Vidal
*Director of the United States Patent and Trademark Office*

CERTIFICATE OF CORRECTION (continued)
U.S. Pat. No. 10,999,439 B2 are not identical.

At Column 23, Line number 60, Claim number 13; edit the claim as follows:
13. The system of claim 8, wherein the plurality of weights is based on a target utilization of at least one agent set of the plurality of agent sets.

At Column 24, Line number 1, Claim number 14; replace the entire claim with the following:
14. The system of claim 8, wherein each of the plurality of weights represents a closeness of fit to the pairing strategy.